(12) United States Patent
Cotton

(10) Patent No.: US 8,072,326 B2
(45) Date of Patent: Dec. 6, 2011

(54) TAMPERPROOF RFID COMPONENT INTEGRATED INTO A MULTILAYER PRINTED CIRCUIT BOARD

(76) Inventor: Martin Cotton, Hertfordshire (GB)

( * ) Notice: Subject to any disclaimer, the term of this patent is extended or adjusted under 35 U.S.C. 154(b) by 362 days.

(21) Appl. No.: 11/646,627

(22) Filed: Dec. 28, 2006

(65) Prior Publication Data

US 2007/0171078 A1    Jul. 26, 2007

(30) Foreign Application Priority Data

Jun. 29, 2005    (WO) ................ PCT/GB2005/002548

(51) Int. Cl.
*G08B 21/00*    (2006.01)
(52) U.S. Cl. .............. 340/572.1; 340/539.31; 340/572.8
(58) Field of Classification Search ............... 340/572.1, 340/572.7, 572.8, 10.1, 539.1, 539.31
See application file for complete search history.

(56) References Cited

U.S. PATENT DOCUMENTS

| | | | | |
|---|---|---|---|---|
| 6,036,099 A | * | 3/2000 | Leighton | 235/488 |
| 6,104,291 A | * | 8/2000 | Beauvillier et al. | 340/572.1 |
| 2003/0030542 A1 | * | 2/2003 | von Hoffmann | 340/5.61 |
| 2003/0104848 A1 | * | 6/2003 | Brideglall | 455/574 |
| 2004/0155763 A1 | * | 8/2004 | Lin et al. | 340/447 |
| 2005/0248438 A1 | * | 11/2005 | Hughes et al. | 340/10.4 |
| 2006/0244581 A1 | * | 11/2006 | Breed et al. | 340/447 |

* cited by examiner

*Primary Examiner* — Jeffery Hofsass
(74) *Attorney, Agent, or Firm* — Michael J. Mehrman; Mehrman Law Office P.C.

(57) ABSTRACT

An electronic device comprising an RFID component which can act in an active mode and a passive mode. Preferably the electronic device is a PCB and the RFID component is at least partially located in the PCB. More preferably, the RFID component is located within the PCB. An electronic device comprising an embedded active component is disclosed. A method of exchanging information within an electronic device is disclosed comprising the steps in providing an electronic device which contains an RFID component which connect in a active and a passive mode, and a remote RFID device, and exchanging information between the RFID component and the remote RFID device.

11 Claims, 23 Drawing Sheets

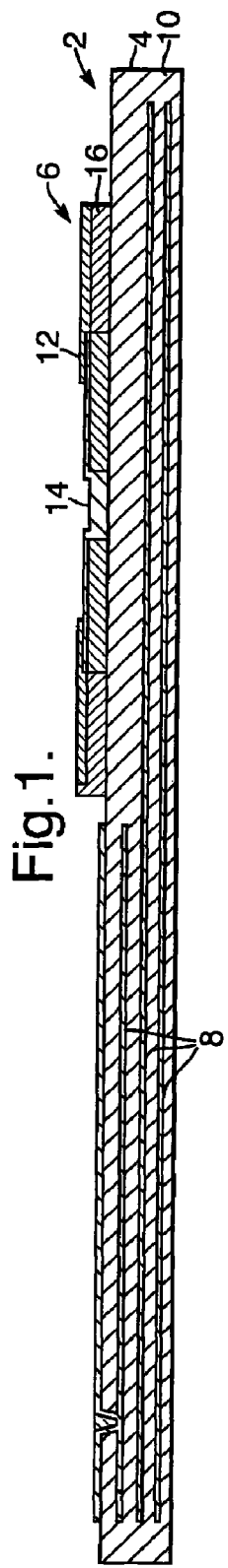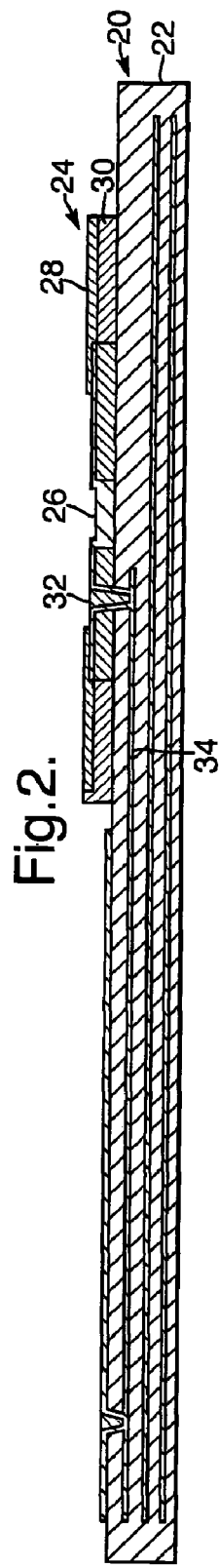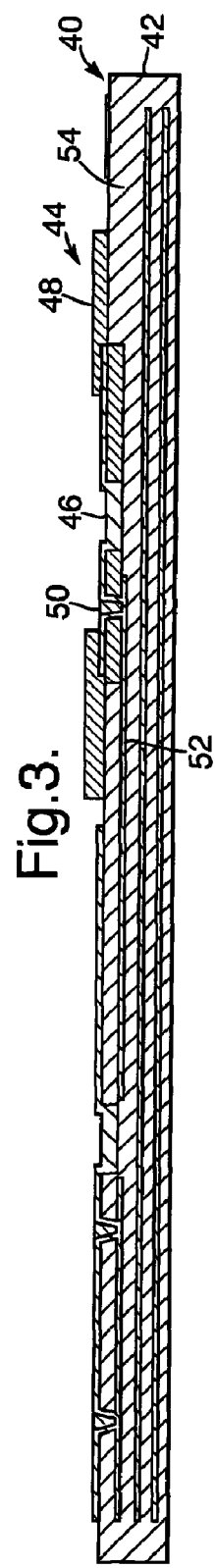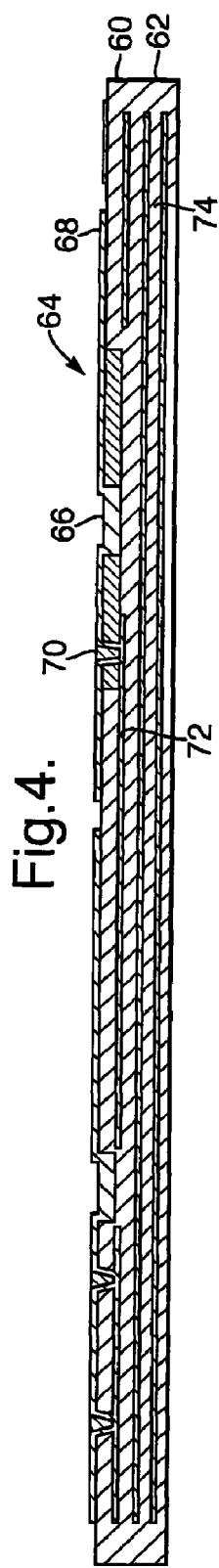

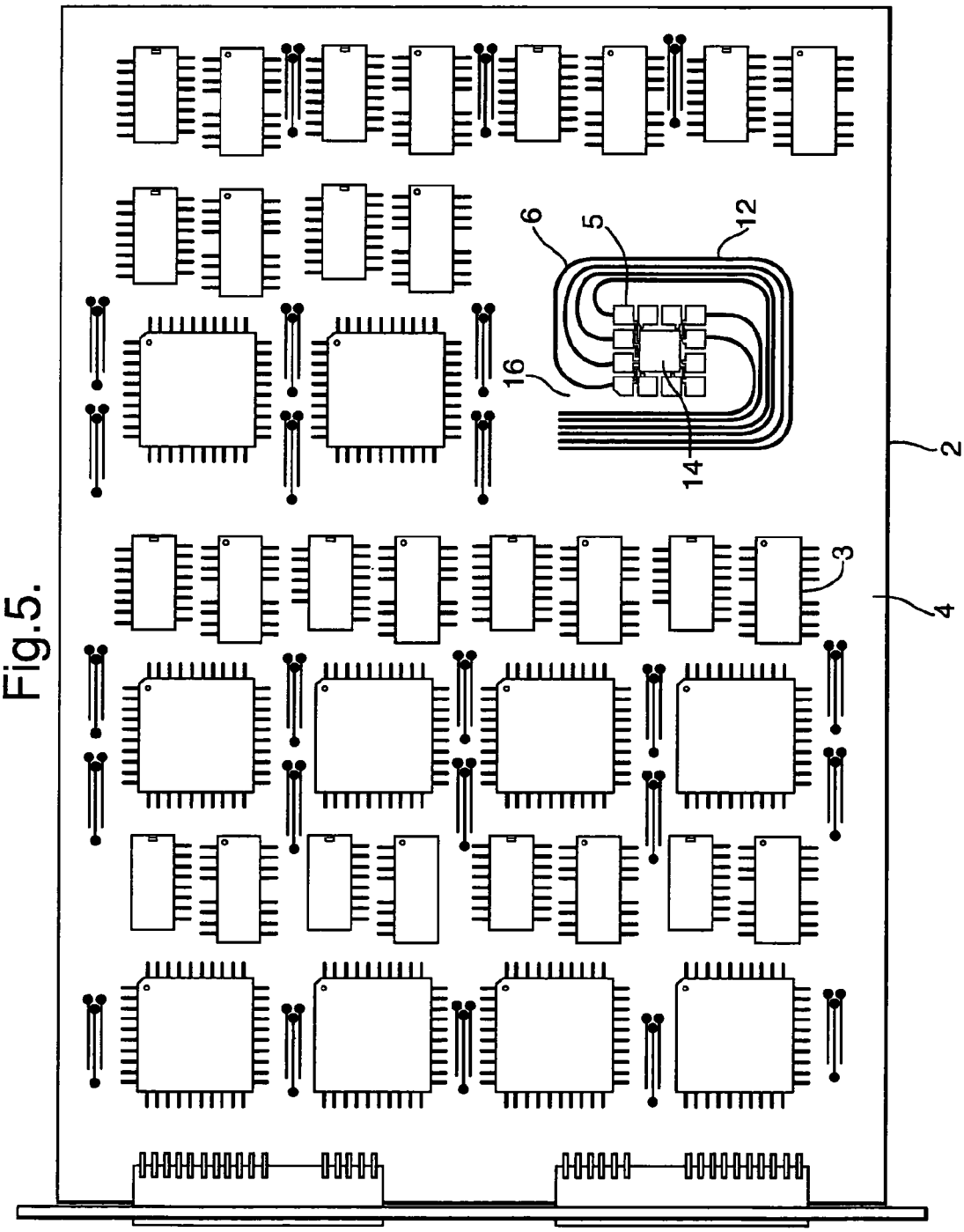

Fig.13.
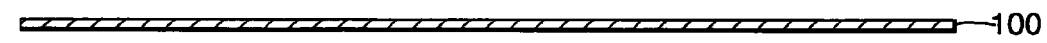
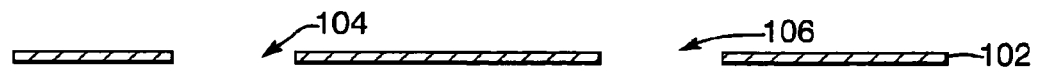
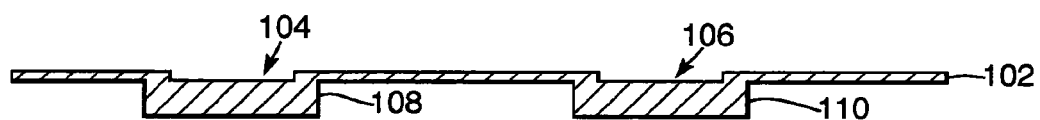
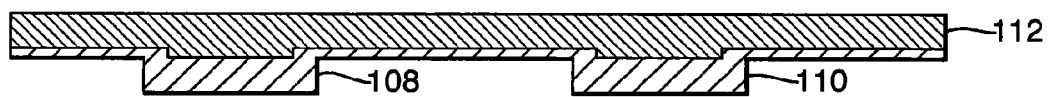
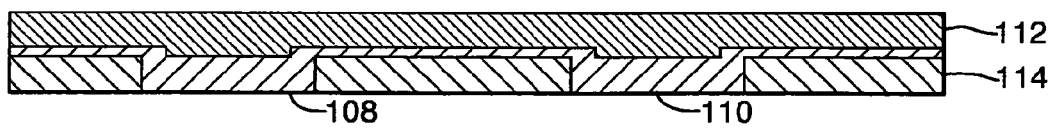

Fig.13.Cont.
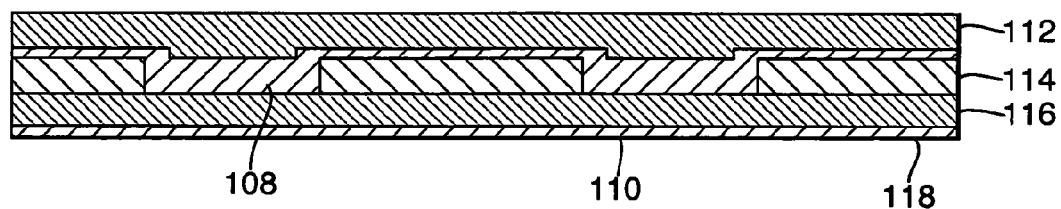
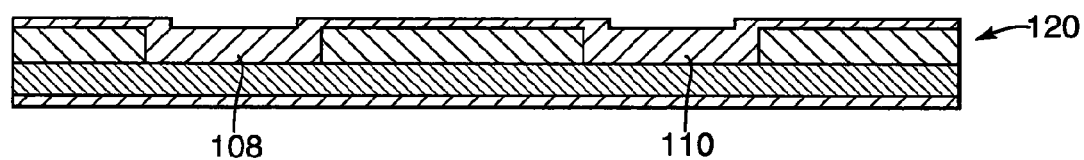
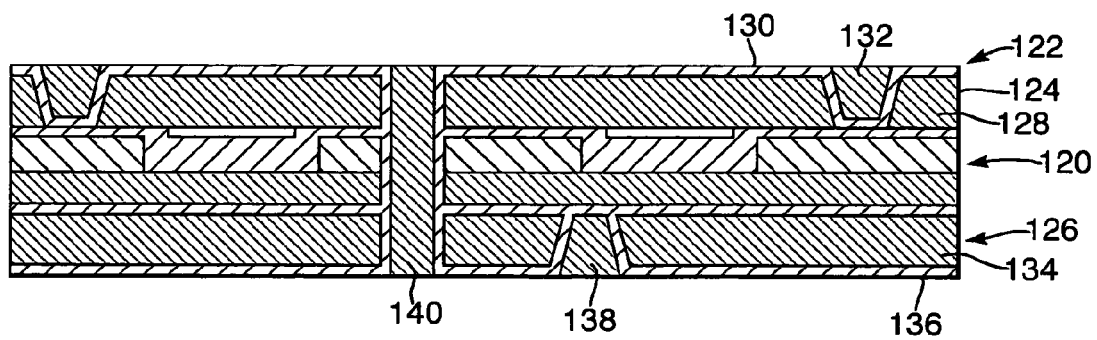

Fig. 29.
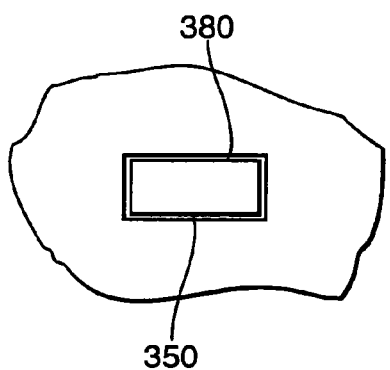
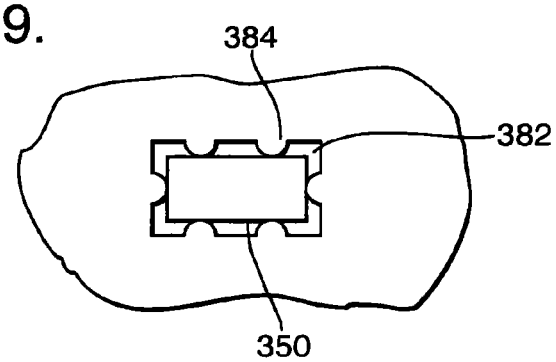
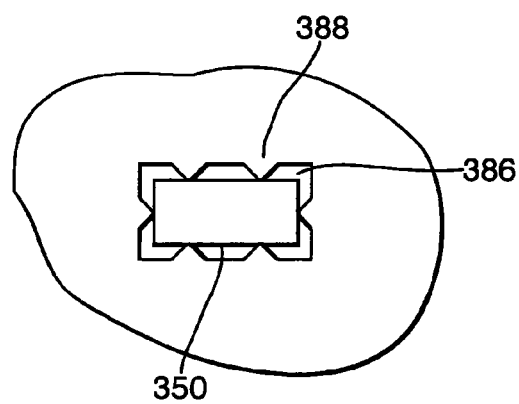
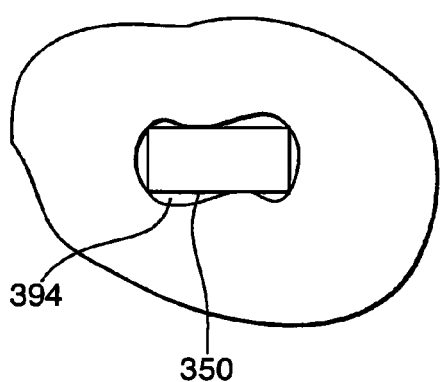
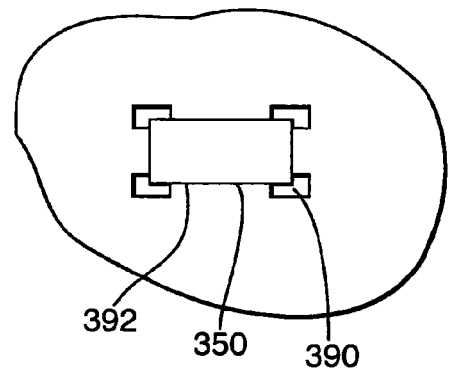

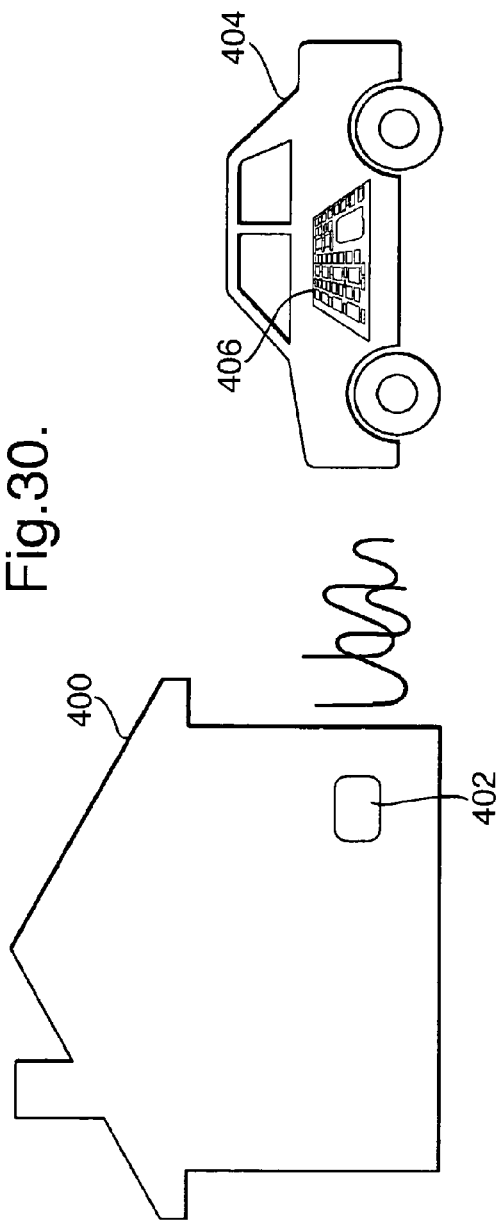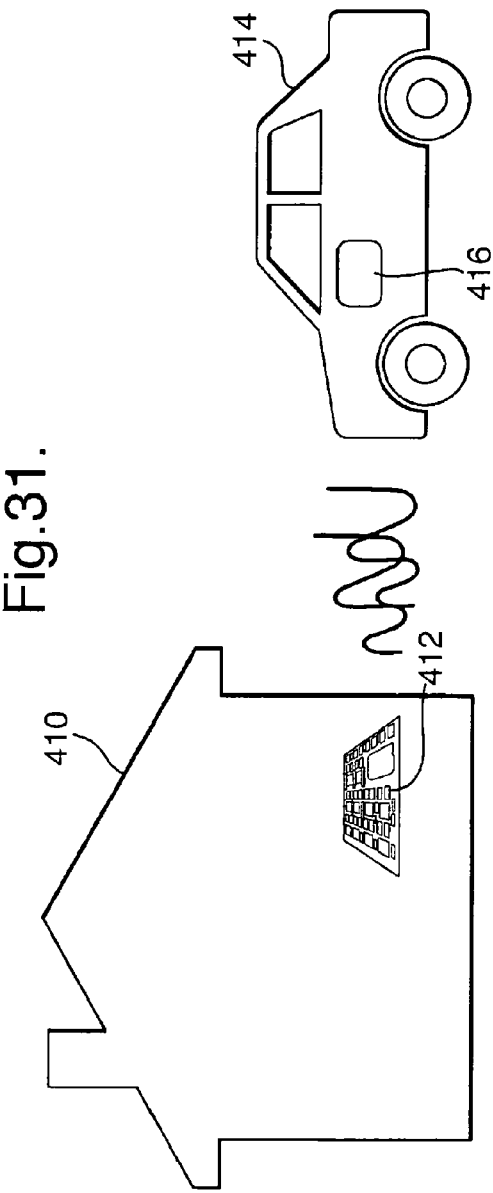

US 8,072,326 B2

TAMPERPROOF RFID COMPONENT INTEGRATED INTO A MULTILAYER PRINTED CIRCUIT BOARD

REFERENCE TO RELATED APPLICATIONS

This application claims priority to PCT Patent Application Number PCT/GB2005/002548 entitled "Improved Electronic Device and Method of Forming an Electronic Device" filed Jun. 26, 2005, which claims priority to Great Britain Application Serial No. 0414569.4 filed Jun. 29, 2004, and Great Britain Application Serial No. 0415169.2 filed Jul. 6, 2004.

BACKGROUND OF THE INVENTION

The present invention relates to an electronic device and to a method of making an electronic device. In particular, it relates to an electronic device comprising an RFID component.

It is useful to be able to obtain information concerning a particular electronic component or device during its manufacture and/or use. In particular, it is useful to be able to obtain such information remotely.

There have been numerous attempts at providing systems to remotely communicate with electronic devices or components, which may be a whole product or a part of a larger product. One of the commonly used methods is the use of radio frequency identification (RFID) components. In general, these are discrete devices which are manufactured separately from the electronic device and attached either during or after manufacture of the electronic device. Typically, the RFID device acts in a passive manner, i.e. it does not operate in a powered or active manner but instead relies upon an external signal in order to provide energy for it to operate. In practice, the RFID device often comprises an antenna or aerial consisting of coils or spirals of wire. When an external interrogating device emits a radio signal to interrogate the RFID device, the antenna absorbs some of the radio signal which then powers the RFID device to re-emit a radio frequency signal in response. Because of the nature of such a passive mode, the responding signal from the RFID device is of a much lower power than the incoming interrogation signal.

This system is widely used but suffers from a number of disadvantages. Firstly, the RFID device is manufactured in a completely separate process to the manufacture of the tagged electronic device. Thus, a separate manufacturing step is required to correctly attach the RFID device to the electronic device. Furthermore, the RFID device can only operate in a passive mode, thus limiting its usefulness and range.

There is therefore a need to provide an improved RFID device-containing electronic component and method of manufacturing the same.

SUMMARY OF THE INVENTION

The present invention is focused at several functions and applications, namely
Integration and embedment of RFID technology into Printed Circuit Board and Printed Circuit Board Assemblies (PCBA's)
Printed Circuit "mass-Lam" process
Printed Circuit Board assembly process (add-on or embedded RFID)
Enablement of taking a non-powered RFID device to being powered, from a passive to an active state and vice versa.
Security applications The present invention also relates to the principle of embedding or mounting RFID devices into or onto electronic devices including what are known as mainstream Printed Circuit Boards (PCB's), including midplanes and backplanes. Mainstream PCB's are of a rigid construction, flexible construction or a flex-rigid construction and are not what is known as CSP, MCM or a device or package. RFID devices of either an active or passive form are included in this principle. RFID devices are designed and made using many varied technologies and all are included in the invention if they can be "connected" to the main PCB. RFID (Radio Frequency Identification Devices) are communication devices that form part of the hardware implementation of product tracking. The product technology generally discussed herein is generally the receiver and therefore principally the mobile part of an RFID tracking system. This receiver generally has a fixed or mobile transmitter (seeker or reader device) that "contacts" the RFID device to ascertain information contained in the device, pertaining to the product such as is required by the retail and security industries. If the device is active then generally it is powered (by battery or other such methods) and is able to transmit to the seeker device when in range of each other. Should the device be passive, then the device receives its power from the transmitter or seeker device and is then able to transmit. Using an inductive coil of some sort (aerial or antenna) as the receiver of signals to power the device is the usual method to obtain power. The general principles and practices of the RFID industry are well known and publicly available. A method of containing information ready for transmission to be communicated to the seeker device can be performed using silicon chips. There are other methods such as using organic technologies, but the focus for this document is silicon. The attachment of the silicon device is usually carried out by using wire bonds to an interposer prior to being attached to the aerial or transmission coil. This description of using the interposer suggests three parts to the total assembly to make up the RFID device, but depending on complexity they can be more or less parts to make a complete device known as a Radio Frequency Identification Device. The interposer is usually of a rigid laminate type, but can be flexible in nature. It is the interposer that houses the silicon either on the its surface or contained within it. The silicon can be encapsulated within laminates or buried within a chamber or cavity. One such method of containing silicon within a chamber or cavity is the MicroSite technology by STS-Atlanta Corporation. The focus of the MicroSite technology is MCM, CSP's and other small format devices, modules and packages that stand-alone confined within the format of their respective descriptions.

One focus of this invention is Printed Circuit Boards (PCB's), rigid, flexible or flex-rigid, back-planes, mid-planes and any form of large format PCB's and Printed Circuit Board Assemblies (PCBA's).

There is disclosed herein a method of using a plurality of dielectric and conductive laminate layers, microvia and MicroSite technology to create a contained printed circuit layer grouping containing chambers and cavities with silicon contained within it that is connected to the conducting layers within the layer grouping. This layer grouping is then connected to the printed circuit board using known PCB technologies such as Microvia and plating technologies.

There is also disclosed herein a method of using an RFID or transmitting/receiving device that is integrated or embedded with a PCB or PCBA to communicate with the assembly machine apparatus during the assembly processes.

There is also disclosed herein a method of using MicroVia and MicroSite technologies to integrate or embed an RFID or transmitting/receiving device with a PCB or PCBA that whilst in a standalone state is passive and non-powered, but when connected to the PCB or PCBA becomes an active or a powered device. The PCB or PCBA must be connected to a power source for this to happen, as in an electronic product, or during manufacture of the printed circuit board, or the assembly processes using assembly aids.

An RFID or transmitting/receiving security device is disclosed comprising a device that is integrated or embedded within a PCB or PCBA. This device is passive when non-powered and active when powered such as when used in an electronic product. The PCB or PCBA that is part of the electronic product uses the above mentioned inventions to create product and security tracking from the Printed Circuit manufacture, the PCB Assembly, the various sub-assemblies, the product assembly, the packaging, inventory and transport of the product, and finally to the installation of the product at its operating base. During the lifecycle of the implementation of the RFID or transmitting/receiving security device, it can switch from being passive to active, and from active to passive.

By taking Printed Circuit Board (PCB) technology and an RFID product technology and combining or integrating the two, a further technology is obtained based on a hybrid of that combination. The resultant combining can result in the RFID or transmitting/receiving portion of the hybrid being positioned on the surface or within the core of the structure. This combining of technologies takes place when the two donor technologies are compatible, i.e. when they are of a typical PCB type or material/process combination.

By using MicroVia and MicroSite technologies to create a large format PCB technology layer grouping, the opportunity for a "mass-lamination" process is accomplished for the "embedded actives" industry. Buried Capacitor and resistor technologies are well known and are part of the embedded passive industry. Buried or embedded actives have not been realised as the chambers or cavities that contain the silicon, do not lend themselves to connection to the rest of the PCB, unless by wire bonding, which is incompatible with current processes.

The resultant "hybrid" technology that forms the "new" PCB allows the PCB to communicate during manufacture and assembly to RFID transmit/receive seeker devices. The seeker devices could be mobile or hand held as part of an assembly process, but also they can be fixed in a situation. One such situation is within or on a PCB manufacturing or assembly machine. This would enable the PCB or PCBA to communicate data to the machine seeker for the specific unit or panel of units. One such use is transmitting data relevant to manufacturing and assembly conditions. Full inventory tracking of every unit would also result.

When the integrated RFID PCB or PCBA hybrid product is not connected to any power source and relies on power being "transmitted" as part of a RFID strategy is deemed passive. When the integrated RFID PCB or PCBA hybrid product PCB or PCBA is connected to a power source, as part of a RFID strategy the device hybrid is deemed active. This enables the PCB or PCBA and or electronic products containing RFID PCB or PCBA hybrid technology to switch states from passive to active and from active to passive depending on the usage and position of the products containing the PCB's or PCBA's. One such scenario is as follows; the Hybrid PCB during manufacture is passive as there is no power source. It can only transmit data when activated from its passive state by an RFID seeker device, either mobile, hand held or fixed. At this time PCB inventory tracking will be one of the activities taking place. During testing it is connected to a machine or device (carrier) that is able to power the PCB to be tested, this enables the Hybrid PCB to switch states and become "active" thereby transmitting data relevant to the testing of the PCB. During the assembly process a similar scenario takes place with the integrated RFID PCB or PCBA hybrid switching from passive too active as the assembly process dictates. Finally when the integrated RFID PCB or PCBA hybrid is assembled and used in the product not only has it been part of an RFID inventory and tracking strategy, but it has negated the requirement for any RFID labelling of the product as the "RFID label" is and has been part of the PCB, PCBA and product during its total lifecycle. This switching of states as described and the integration technology as previously described enable many process improvements and improved inventory control.

With the completed electronic product able to communicate to a seeker device as described previously, the opportunity to realise a security strategy based on this is essential. During an inventory cycle, an electronic product is able to communicate data via the previously described method to a number of mobile or fixed seeker units that form an RFID inventory or security strategy. During transport or storage the product acts in a passive manner, gaining power for transmission from the signal transmitted from the seeker module or unit. When the electronic product is installed for usage it is connected to a power source to operate, and when this happens the RFID PCB or PCBA hybrid product within the electronic product has the opportunity to change state and become active. This is an option that would be product driven and product specific, and in some products, remaining in a passive state would be preferable. Because the RFID or transmitting portion of the hybrid is always contained within the electronic product since manufacture and assembly, it will always be able to transmit data that would signify if the device is in the situation desired or has been moved or removed. One such method would be that after installation and operation of the electronic product, the RFID PCB or PCBA hybrid device as previously described would communicate to a seeker that it is where it should be as installed. If the electronic device was removed from its situation and came outside of the range of the seeker and its relevant RFID strategy, then an alert would be communicated to a device as part of an overall security package. In its powered state the device has a transmission range that is typically greater than when in a passive state. As mentioned previously RFID technology is public and well understood.

According to the present invention, there is provided an electronic device comprising an RFID component which can act in an active mode and a passive mode.

Preferably, the RFID component is on a PCB.

Conveniently, the RFID component is at least partially located in the PCB.

Advantageously, the RFID component is at least partially integrated into the PCB.

Preferably, the RFID component is completely integrated into the PCB.

Conveniently, the RFID component is at least partially integrated into the surface of the PCB.

Advantageously, the RFID component is located within the PCB.

Preferably, the PCB is a multilayer PCB.

Advantageously, the RFID component is electronically connected to a layer of the PCB.

Preferably, the layer is located within the PCB.

Conveniently, the RFID component comprises an antenna.

Advantageously, the antenna comprises metal.

Preferably, the antenna comprises copper, platinum, silver, gold, tin and/or aluminium.

Conveniently, the antenna comprises conductive polymer, conductive ink and/or conductive plastics.

Advantageously, the active mode of the RFID component is powered by electrical energy supplied through the PCB.

Preferably, the RFID component can transmit and receive information.

Conveniently, the device is made by mass-lamination techniques.

According to a further aspect of the present invention, there is provided a method of making an electronic device comprising the step of providing an RFID component which can actin an active mode and a passive mode.

Preferably, the method comprises mass-lamination techniques.

According to another aspect of the present invention there is provided a method of exchanging information with an electronic device comprising the steps of providing an electronic device of the invention and a remote RFID device, and exchanging information between the RFID component and the remote RFID device.

Preferably, the information exchange occurs during the manufacture of the electronic device or its components.

Conveniently, the information comprises identification information.

Advantageously, the information comprises information other than identification information.

According to yet another aspect of the present invention, there is provided an electronic device comprising an embedded active component.

Preferably, the device comprises a laminate structure.

Conveniently, the device is a layer grouping.

Advantageously, the device forms part of of a larger device.

Preferably, the component is located within a layer within a multi-layer circuit board.

Conveniently, the component is an RFID device.

Advantageously, the component can act in an active and in a passive mode.

The present invention will now be described, by way of example with reference to the accompanying drawings.

BRIEF DESCRIPTION OF THE DRAWINGS

FIG. 1 is a cross-sectional view of the device without attached RFID device.

FIG. 2 is a cross-sectional view of a further device having an RFID device.

FIG. 3 is a cross-sectional view of the device having an integrated RFID device.

FIG. 4 is a cross-sectional view of the device having an imbedded RFID device.

FIG. 5 is a plan view of a device shown in FIG. 1.

FIG. 13 is a schematic illustration of the manufacture of a PCB containing buried active components.

FIG. 29 comprises plan views of assembly aids which contain components.

FIG. 30 is a schematic illustration of a security application of an RFID containing electronic device.

FIG. 31 is a schematic illustration of a further application of an RFID containing electronic device.

DETAILED DESCRIPTION

Figure 6:
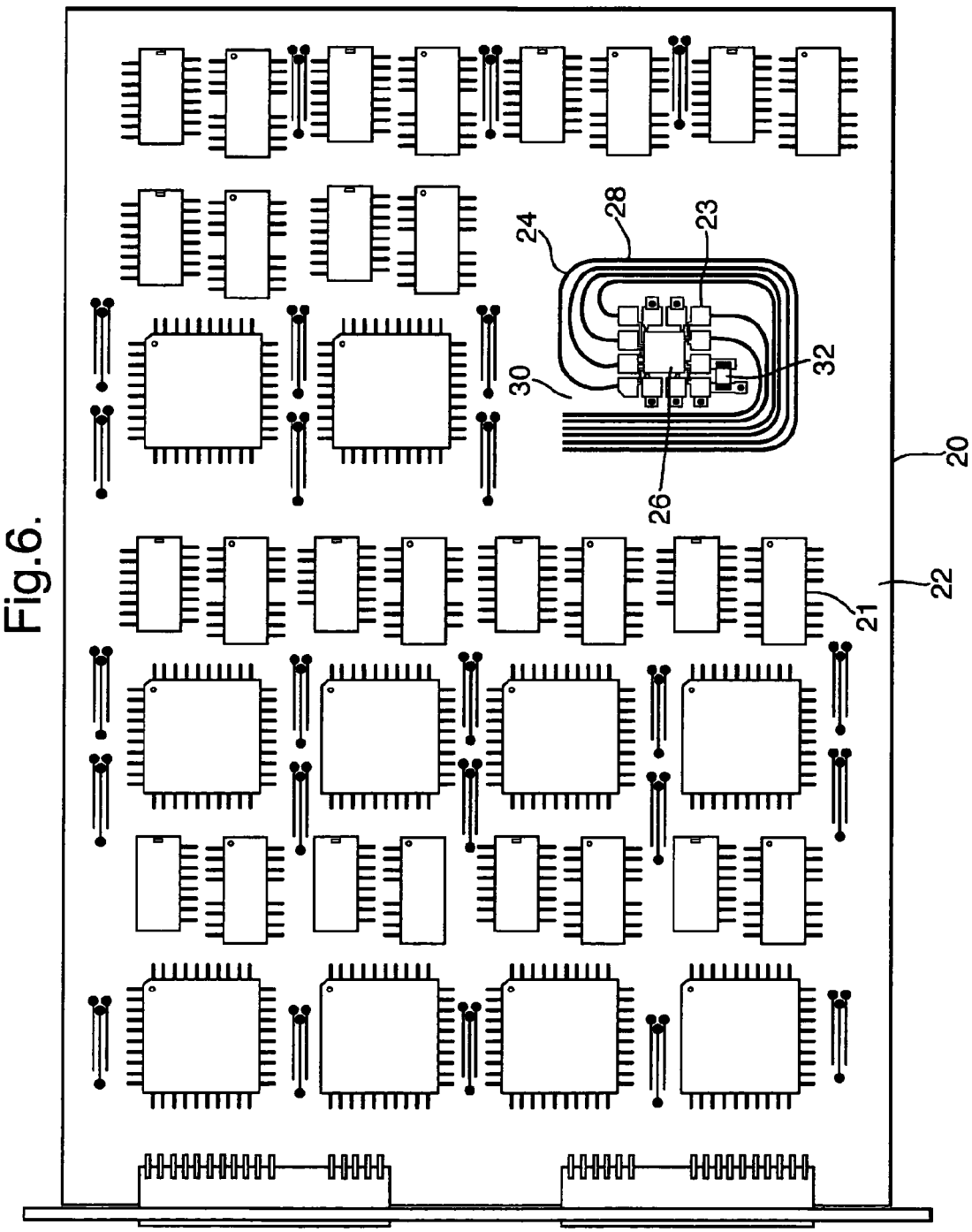
FIG. 6 is a plan view of a device shown in FIG. 2.

Turning to FIG. 1, a prior art RFID tagged device is shown generally at 2. It comprises a multi-layer circuit board 4 with a RFID device 6 attached to its upper surface. The multi-layer PCB 4 comprises layers of conductive material 8 separated by non-conducting material such as epoxy resins, ceramic materials or plastics. The RFID device comprises an antenna 12 comprising copper attached a silicon core 14. In other embodiments, the antenna may comprise other conductive materials, for example, the antenna could comprise one or more metals, such as platinum, aluminium, silver or gold or alloys thereof, or materials such as conductive polymers, conductive plastics or conductive inks. The components 12 and 14 of the RFID device 6 are located on an adhesive backing 16 which attaches it to the multi-layer PCB 2. The RFID device 6 and the multi-layer PCB 2 are mechanically but not electronically connected together. In other words, the RFID device 6 is a separate discrete component which is merely physically attached to the upper surface of the PCB 2. There is no electronic interaction between the two components. The RFID component 6 operates only in a passive mode, in response to an interrogation signal from a remote seeker/reader device. FIG. 5 shows a plan view of the device 2 shown in FIG. 1. In this view, the RFID device 6 can be seen on upper surface of the PCB 4, surrounded by a number of other components attached to PCB 4, such as chip 3. The coil 12 can be seen to comprise six spiralling tracks of copper which spiral around the silicon core 14. The antenna could have different configurations and shapes, such as a linea shape. The copper tracks 12 are each joined to a terminal 5 which is connected to the silicon core 14.

According to the present invention, the RFID device could be integrated with other components in various ways and to various degrees. Turning to FIG. 2, a device 20 is shown which comprises a multi-layer PCB 22 which is provided with an RFID device 24. The overall construction of the device 20 is similar to that of device 2 shown in FIG. 1 with one very important difference.

The RFID device 24 again comprises a silicon-containing core 26 surrounded by an antenna 28. The device 24 has an adhesive backing 30 which allows it to be located on the upper surface of the PCB 22. In other embodiments, the device 24 could be attached using other PCB compatible materials such as a UV-curable resin. However, after the initial manufacture of the multi-layer PCB 22, a secondary process has resulted in the creation of a microvia extending from the upper surface of the PCB 22 to the first conductive layer 34 contained therein. In other embodiments, the device could be connected to other conductive layers of the PCB. There are many known methods and techniques for forming such microvias. The opening created from the upper surface of the PCB 22 down to the first connective layer 34 is provided or coated with a conductive coating of copper. This electronically connects the RFID device 24 with the PCB 22. This allows the RFID device 24 to operate both in a passive mode and in an active mode. In a passive mode, the RFID device 24 merely acts in response to an interrogation signal from a remote seeker unit. The antenna 28 absorbs energy from the incoming radio waves and allows the coil 26 to provide a response which is re-emitted from the antenna 28. However, the connection 32 between the RFID device 24 and the conductive layer 34 of the PCB 22 allows the device 24 to be powered. This could be from a battery unit attached to the device 20 or by an external energy source connected to device 20. Furthermore, in addition to merely responding to an interrogation signal, the RFID device 24 could be used in an active mode to broadcast or transmit information without first receiving an interrogation signal. There are numerous applications for this technology, both during the manufacture of such a device or its subsequent use.

FIG. 6 is a plan view of the device 20 shown in FIG. 2. Again the RFID device 24 can be seen located on the upper surface of the PCB 22, surrounded by a number of other components attached to the PCB 22, such as chip 21. The spiralling copper tracks of the antenna 28 each connect to a terminal 23 which is connected to the silicon core 26. Two of the terminals which are not connected to copper tracks of the antenna 28 are connected by a copper coated microvia 32 which leads down to the first layer 34 of the PCB 22.

Taking the technology one stage further, FIG. 3 shows an electronic device 40 comprising a multi-layer PCB 42 having an interrogated RFID device 44. However, in contrast to the devices shown in FIGS. 1 and 2, the RFID device 44 is integral with the PCB 42, rather than being physically attached to its upper surface in a secondary process.

In particular, the RFID device again comprises a silicon core 46 attached to a surrounding antenna 48. In this case, the silicon core 46 is integrally formed, has a component in the first layer 54 of the multi-layer PCB 42. The component 46 is formed in the primary process of manufacturing the PCB 42 rather than being attached or manufactured during a later secondary process. Again, a microvia has been created by laser ablation of part of the first layer of the board 42 allowing copper 50 to form a connection between the components of the RFID device 44 and the first conductive layer 52 of the device 42. Again, the RFID device 44 may operate in a passive mode or an active mode. The antenna 48 comprises a conductive polymer which is coated onto the upper surface of the PCB 42 in a secondary process.

Figure 7:
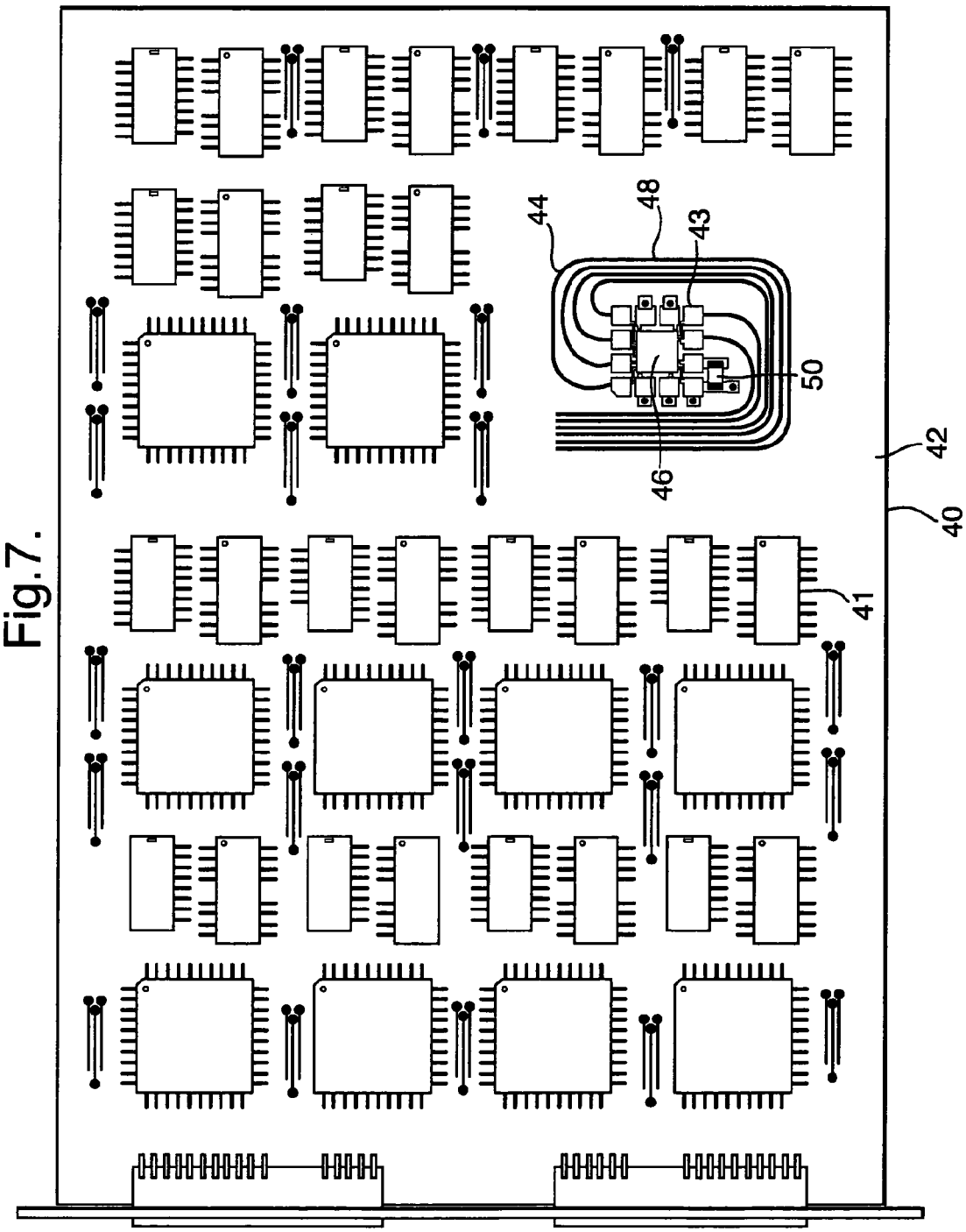
FIG. 7 is a plan view of a device shown in FIG. 3.

FIG. 7 is a plan view of the device 40 showing the RFID device 44 on the upper surface of the PCB 42. Again, the RFID device 44 is surrounded by other components which are attached to the PCB 42, such as chip 41. The chip 41 is manufactured separately and placed into the desired location, such as the first layer grouping shown in FIG. 7. In this specification the word "layer" is used in several different contexts. It can mean a single layer of material, such as copper or epoxy resin. It may also be used to mean a discrete laminate unit comprising a plurality of individual layers, such as a lower conductive layer, an intermediate non-conductive layer and an upper conductive layer. It may also be used to mean a layer grouping, i.e. a collection of components assembled into a laminate structure. The tracks which form the antenna 48 are conductive polymer which have been coated onto the upper surface of the PCB 42 as a secondary process. The tracks 48 lead to terminals 43 which are connected to the silicon core 46. In a similar way to the silicon core 46, the terminals 43 are formed from the upper layer of the PCB 42. A copper coated microvia 50 connects two of the terminals to the first layer 52 of the PCB 42.

FIG. 4 shows a device 60 comprising a multi-layer PCB 62 with an embedded/integrated RFID device 64. Again, the RFID device is integrated within the first layer grouping of the multi-layer PCB 62. The RFID device comprises a silicon core 66 surrounded by an antenna 68. In this case, the antenna 68 is formed from copper in a primary process during the manufacture of the PCB 62. The layer of copper on the upper surface of the multi-layer PCB 62 is etched to provide the coils of the antenna 68. Again, there is a microvia providing electrical connection 70 between the RFID device 64 and the first conductive layer 72 of the PCB 62.

Again, the RFID device 64 can operate in an active or passive mode, depending upon the circumstances. One particular application of this technology is to track electronic components during manufacture. A PCB and/or a panel comprising a plurality of PCBs may be provided with an attached/integrated RFID device.

Figure 8:
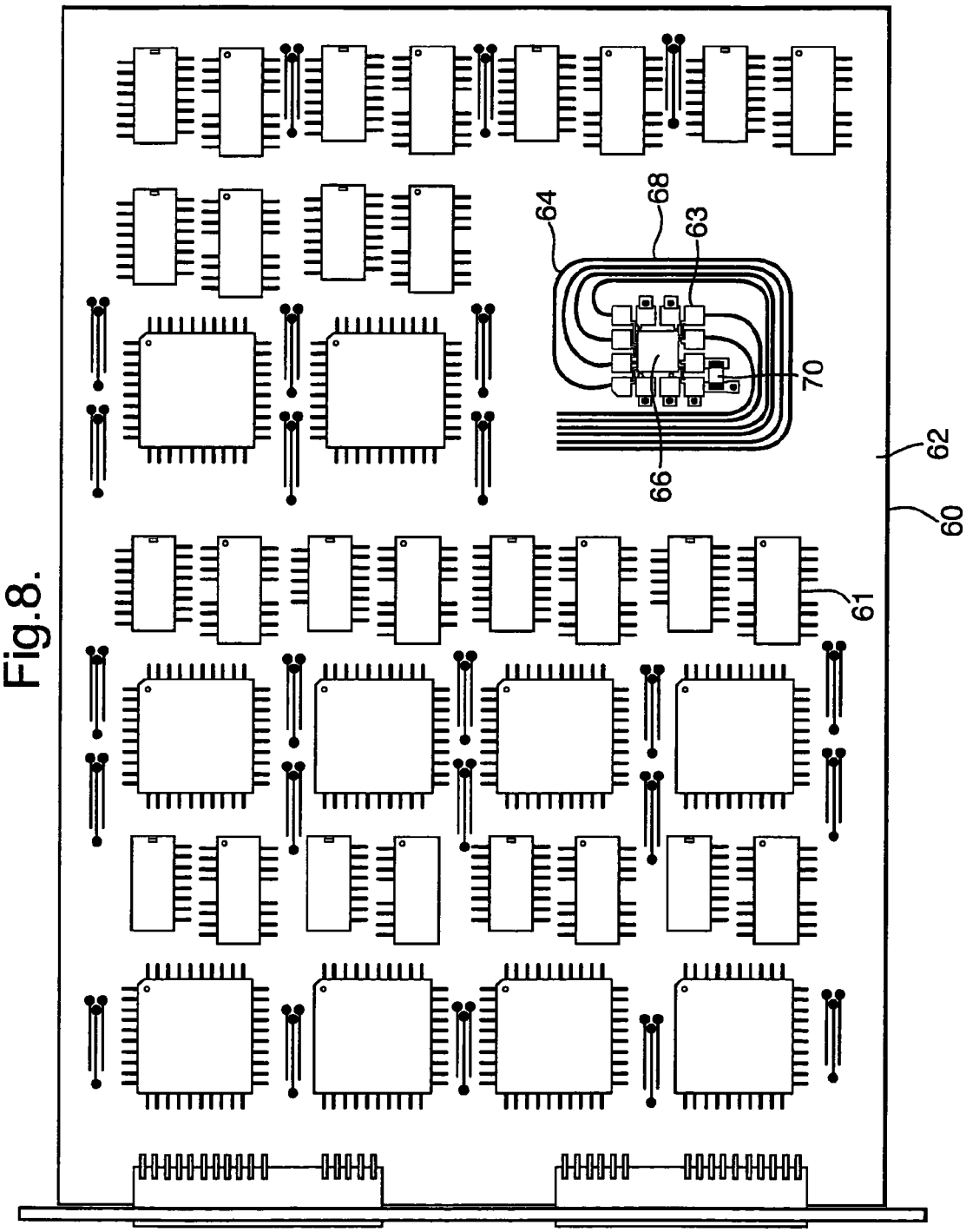
FIG. 8 is a plan view of a device shown in FIG. 4.

FIG. 8 is a plan view of the device 60 showing the RFID device 64 on the PCB 62. The RFID device 64 is surrounded by a number of other components attached to the PCB 62, such as chip 61. The six copper tracks which make up the antenna 68 each terminate in a terminal 63 connected to a silicon core 66. A copper coated microvia 70 connects two other terminals to the first conductive layer 72 of the PCB 62. As mentioned above, the chip 61 is manufactured separately and placed into a recess or aperture as required. The copper tracks which comprise antenna 68 were formed by an etching process from the layer of copper on the PCB 62 in its primary manufacturing process.

Although the RFID device 64 is shown on the upper surface of the PCB 62, it could be encapsulated or covered up in a number of ways by suitable materials, such as solder resist. An RFID device could also be embedded within a structure to give a buried active and/or passive device.

Figure 9:
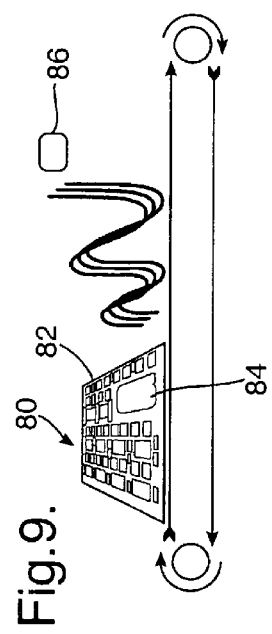
FIG. 9 is a schematic view of an RFID containing device during manufacture.

FIG. 9 shows the use of the technology and the manufacture of an electronic device 80. The device 80 comprises a PCB 82 which is having a number of electronic components attached thereto. The board 82 comprises an integral RFID device 84 which has a structure substantially as shown above in FIG. 4. The RFID device 84 is embedded into the first layer of the PCB 82 and is in electronic communication with the board. In a manufacturing step, the device 80 passes near a remote seeker device 86. The seeker device 86 emits an interrogation signal 88 to ascertain the identity and status of the component 80. Acting in a passive mode, the RFID device 84 responds to the seeker 86 concerning its identity and status. Thus, the integration of the RFID device into or within the component 80 provides a number of security advantages. Firstly, the RFID device cannot be misplaced, become detached or lost from the unit 80. It is integral with the device 80 and cannot be tampered with.

Figure 10:
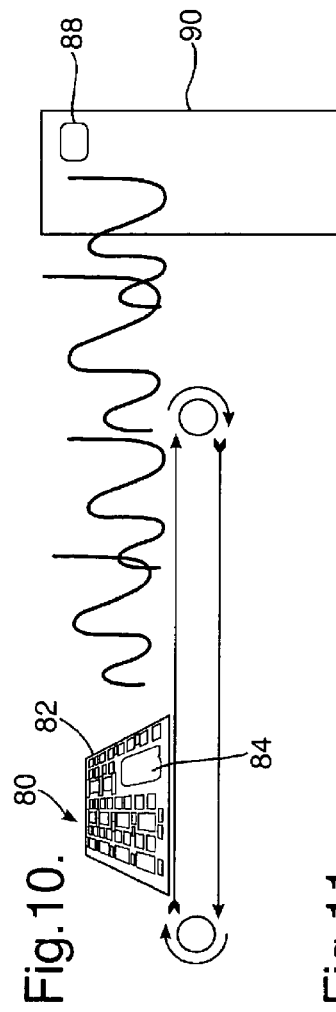
FIG. 10 is a further schematic view of an RFID containing device during manufacture.

FIG. 10 shows an electronic component 80 during manufacture, comprising a PCB 82 with an integral RFID component 84. In this case, a remote seeker 88 is located in a self-contained unit 90 which tracks components on a number of separate manufacturing lines. RFID devices acting in an active mode have a larger range than in a passive mode, allowing a greater distance to a remote seeker/reader. The component 80 is provided with a battery unit allowing the RFID device 84 to operate in an active mode. Although passive operation would be most used during manufacture, an active mode would allow more flexibility in the location of the seeker/reader. Thus, either pre-emptively or in response to an interrogation signal from the seeker 88, the RFID device 84 can transmit information over a much longer range than when it is operating in a passive mode.

Figure 11:
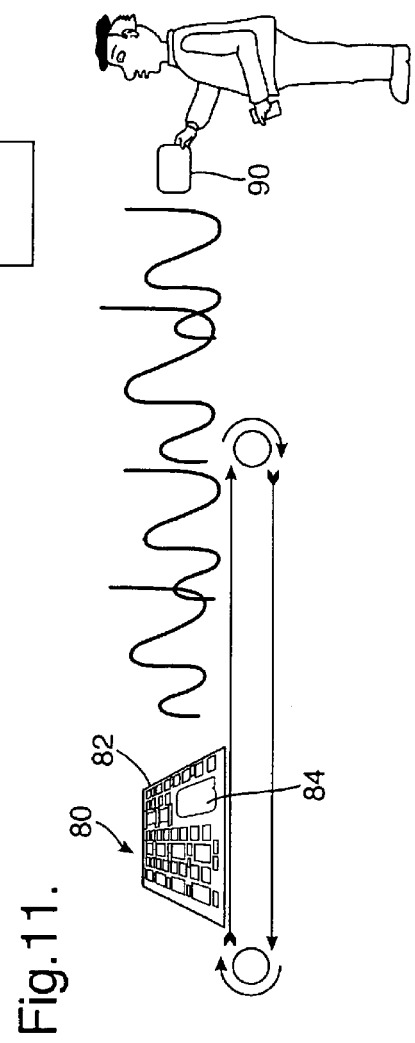
FIG. 11 is a further schematic view of an RFID containing device during manufacture.

FIG. 11 shows a further manufacturing process involving the component 80 having the PCB 82 with integral RFID device 84. A hand held portable seeker device 92 is used to interrogate the RFID device 84 which again acts in an active mode.

Figure 12:
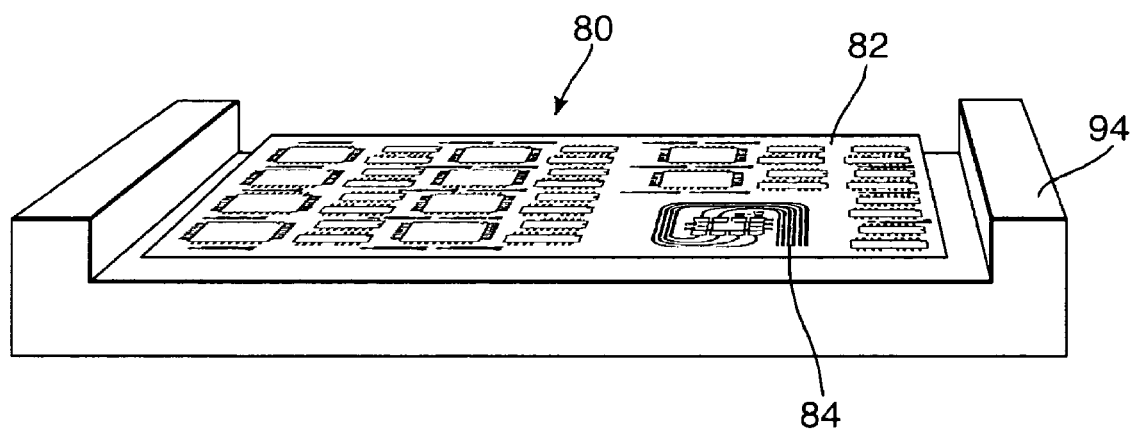
FIG. 12 is a perspective view of an RFID containing device on an assembly aid.

FIG. 12 shows the electronic device 80 again comprising a PCB 82 with integral RFID device 84 on a carrier or assembly aid 94. The carrier 94 is used in many manufacturing processes to carry components around manufacturing processes. The carrier 94 is powered and is electronically connected to the component 80. The RFID device 84 may thus act in an active, mode, powered by the carrier 94.

The present invention is also applicable to mass lamination processes otherwise known as "masslam". The technique can be used to manufacture electronic devices and in particular printed circuit boards, especially multi-layer printed circuit boards with embedded active silicon components. FIG. 13 shows a manufacturing process for producing a PCB with active silicon components embedded within it. A sheet of copper foil 100 is etched using conventional PCB techniques to give a etched sheet 102 with apertures 104 and 106. The apertures are shaped to provide fingers which may be attached to silicon components to provide electrical connection. The manufacturing process begins with a sheet of copper foil 100. The foil 100 is an image and etched using traditional PCB techniques to give an etched sheet 102 containing apertures 104 and 106. The apertures 104 and 106 are shaped and dimensioned so as to provide electrical fingers and connections for connection with active components such as silicon chips. As shown, silicon chips 108 and 110 are aligned with apertures 104 and 106 respectively and connected to the copper foil 102 using ultrasonic welding. This provides an electronic connection between the silicon chips and the copper foil 102 without using traditional techniques such as wire bonding. Because of the flimsy nature of the etched sheet 102, a backing layer 112 is then provided to give mechanical stability during handling and processing. Alternatively to being attached to the copper side of the sheet 102, a backing layer could be provided to the silicon chip side. The backing layer 112 is attached to the sheet 102 whilst the structure is constrained by an assembly aid.

Figure 14:
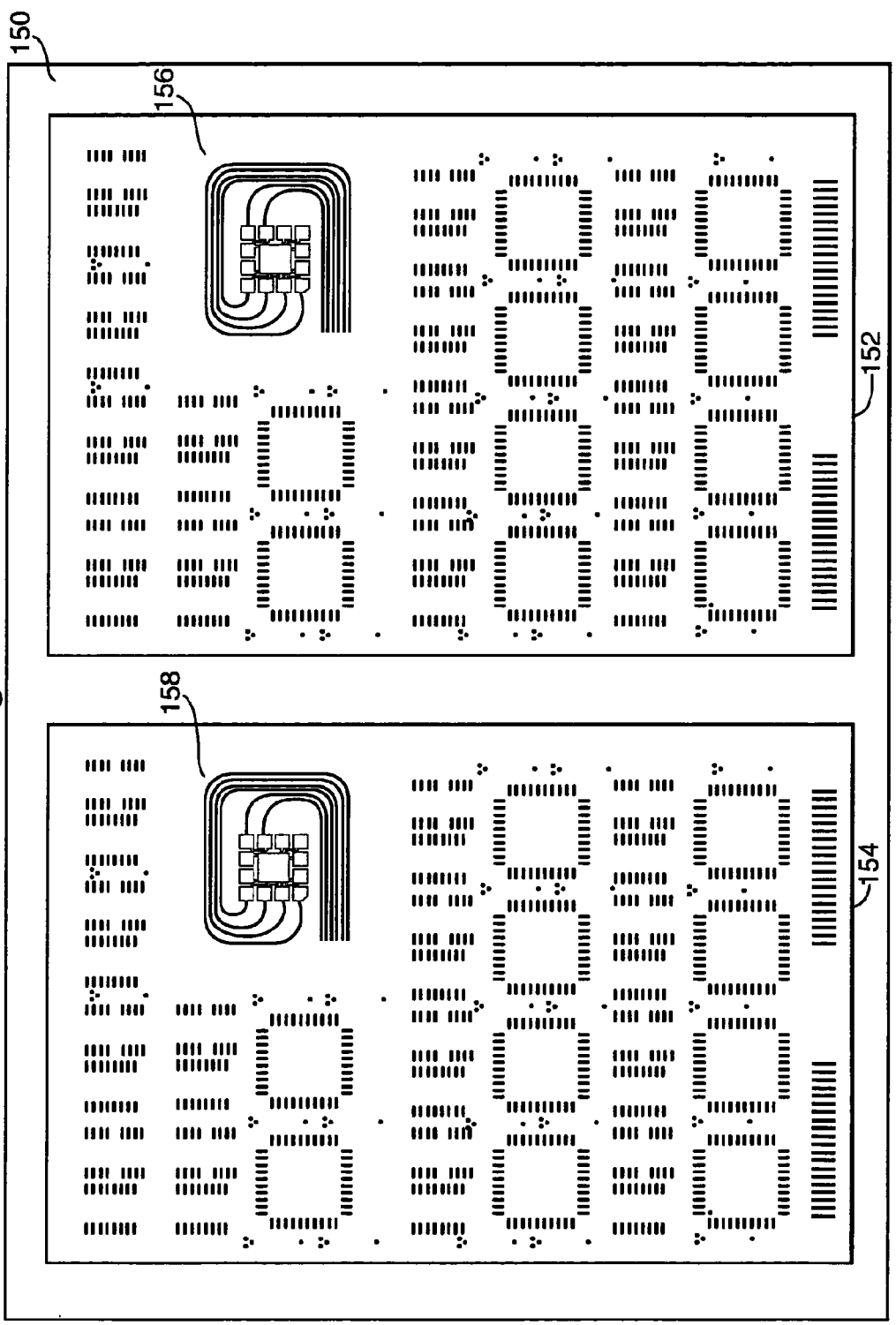
FIG. 14 is a plan view of a PCB panel containing RFID devices.
Figure 15:
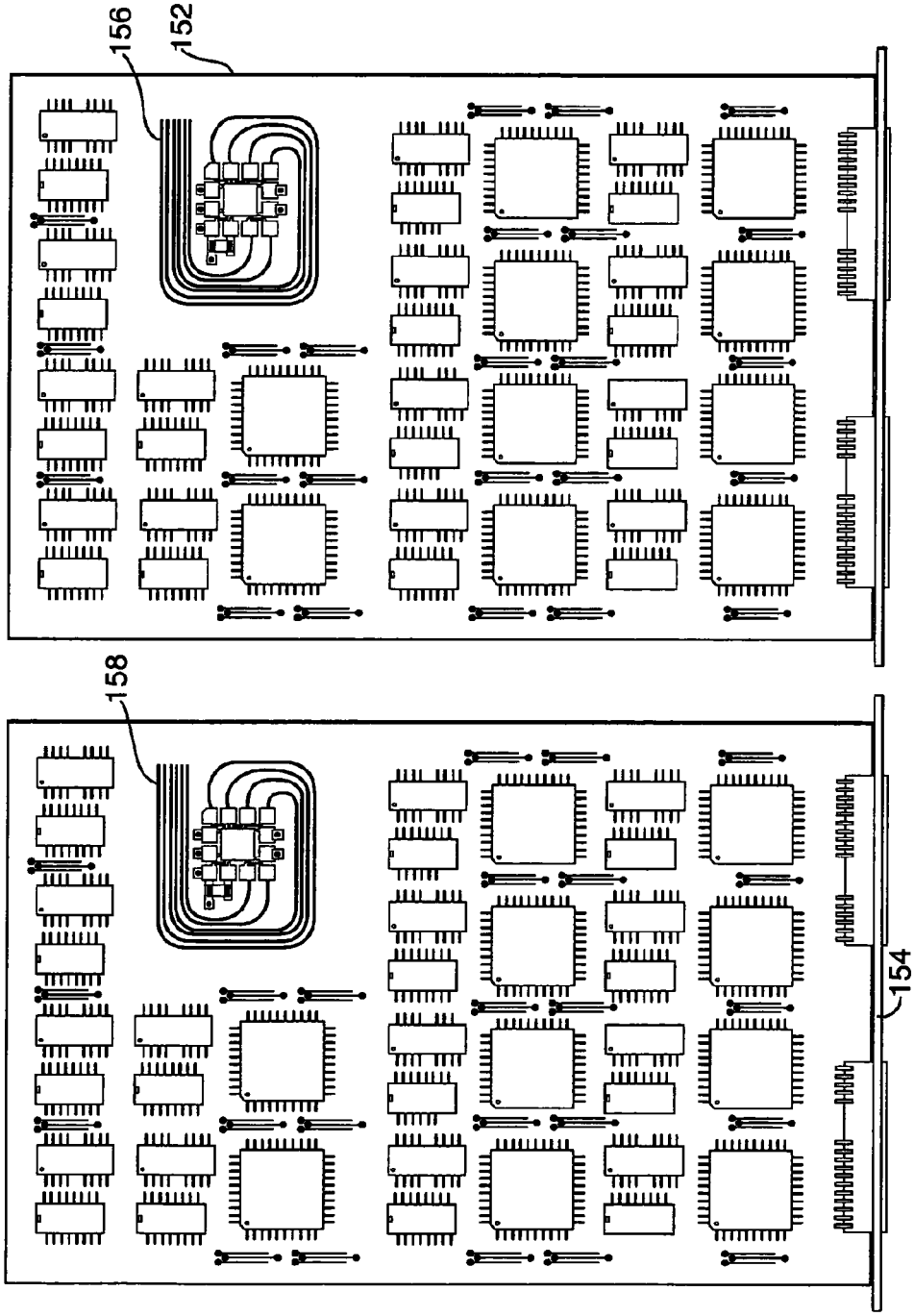
FIG. 15 is a plan view of an assembled PCB panel containing RFID devices.

A pre-preg or core layer 114 is then attached to the chip side of the sheet 102 using traditional PCB techniques. Further pre-preg layers may then be added. As shown, a non-conductive layer 116 is then attached to the layer 114, followed by a conductive layer 118. The backing layer 112 is then removed to give a completed laminate structure 120. The laminate structure 120 contains chips 118 and 110 which are buried or embedded within the laminate structure 120. The chips 118 and 110 are electronically connected to the copper layer 102. The chip 108 provides RFID functionality 118 and 110 provides processing capability. The laminate structure 120, containing such embedded active functionality, may be sold onto other manufacturers for incorporation into a wide range of products. It may also be used in-house to provide other products and may also be used to manufacture a multi-layer product such as the multi-layer board 122. Board 122 may be considered to comprise three distinct layers, an upper layer 124, an intermediate layer 120 and a lower layer 126. The upper layer 124 comprises an upper conductive layer 130, an intermediate non-conducting layer 128 which is bonded onto the upper surface of the laminate structure 120. The lower layer 126 comprises an intermediate non-conductive layer 134 which is attached to the lower surface of laminate structure 120, followed by a conductive layer 136 on its outer surface. The upper layer 124 contains a coated mircovia 132 which provides electrical connection between the conductive layer 134 and the upper conductive layer of the laminate structure 120. A mirovia 138 provides an electrical connection between the lower conductive layer 136 and the lower conductive layer of the laminate structure 120. A PTH 140 provides electrical connection between the various layers of the structure 122. The use of integrated RFID devices allows the tracking of electronic devices not only after manufacture but also during manufacture. In particular, the possibility of passive and/or active modes allows for a wide range of tracking, quality control and security. FIG. 14 shows a panel 150 comprising two PCB's 152 and 154 during manufacture. PCB 152 has an RFID device 156 and PCB 154 has a RFID device 158. The RFID devices 156 and 158 are attached to the surface of the PCB's and act in a passive mode. They can be used to track the panel 150 as it passes through the various manufacturing processes. Also, the RFID's 156 and 158 can respond to interrogation signals from various seeking devices during the manufacturing process. In addition to merely identifying the panel 150 and the PCB's 152 and 154, the RFID devices 156 and 158 can also supply information concerning the manufacturing status and information concerning function of the various components being added to the panel 150. Further, FIG. 15 shows the PCB's 152 and 154 at a later stage of manufacture. The PCB's 152 and 154 have been detached from the panel 150 and have a number of electronic components attached thereto. They are now finished products ready for final use. The RFID components 156 and 158 can now be used to track the PCB's 152 and 154 and to provide information concerning the location of manufacture, manufacturer's details and information concerning the identity and functioning of the other components on the PCB's. During and after manufacture, they can act in a passive or active mode, wherein the active mode could be powered by a battery on the PCB or be powered by an external source, such as a powered carrier or a testing device.

Figure 16:
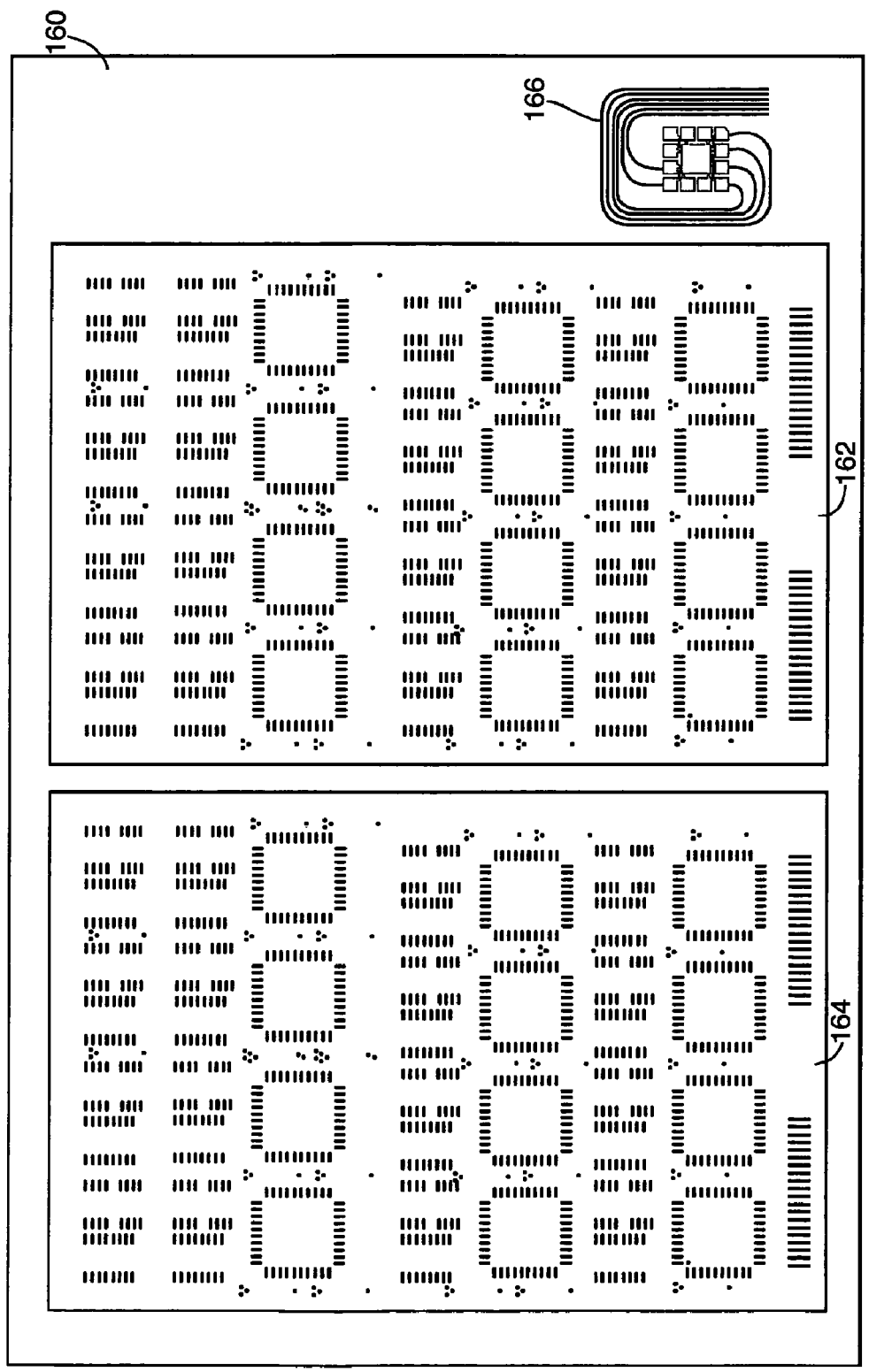
FIG. 16 is a plan view of a PCB panel containing an RFID device.

FIG. 16 shows an alternative way of tracking components during manufacture. A PCB panel 160 contains two PCB's 162 and 164 which are to have a number of electronic devices and components attached thereto. An RFID device 166 is attached directly to the panel 160, rather than to the PCB's 162 and 164. In this way, the panel itself (and therefore the PCB's 162 and 164) can be tracked during manufacture.

Figure 17:
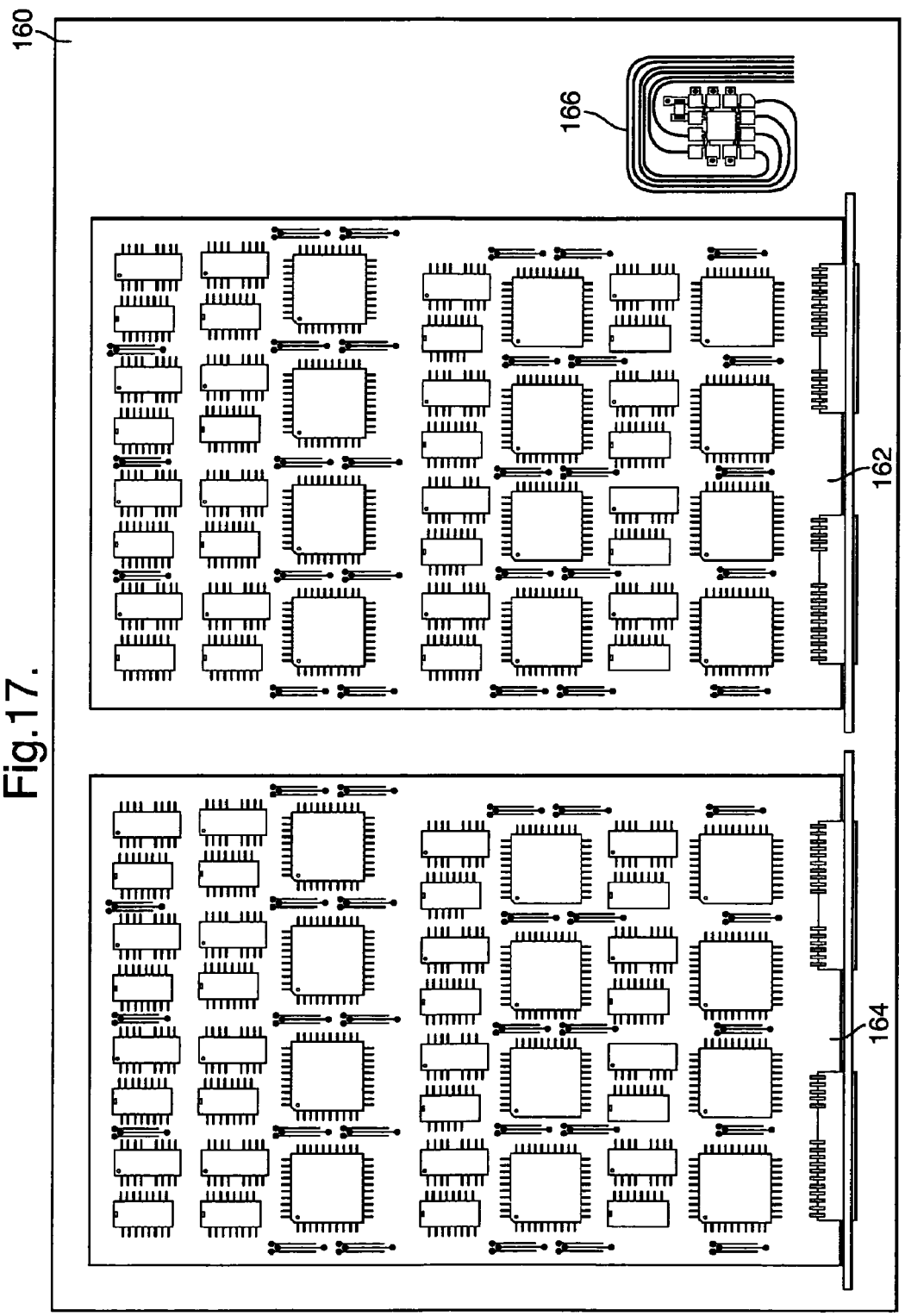
FIG. 17 is a plan view of a PCB panel containing an RFIB device.

FIG. 17 shows the panel 160 nearing the end of the manufacturing process. The PCB's 162 and 164 have a complete set of electronic components attached thereto and are ready for removal from the panel 160. The RFID device 166 moreover will have served its purpose during the manufacturing process. Neither of the PCB's 162 and 164 have an RFID device attached.

Figure 18:
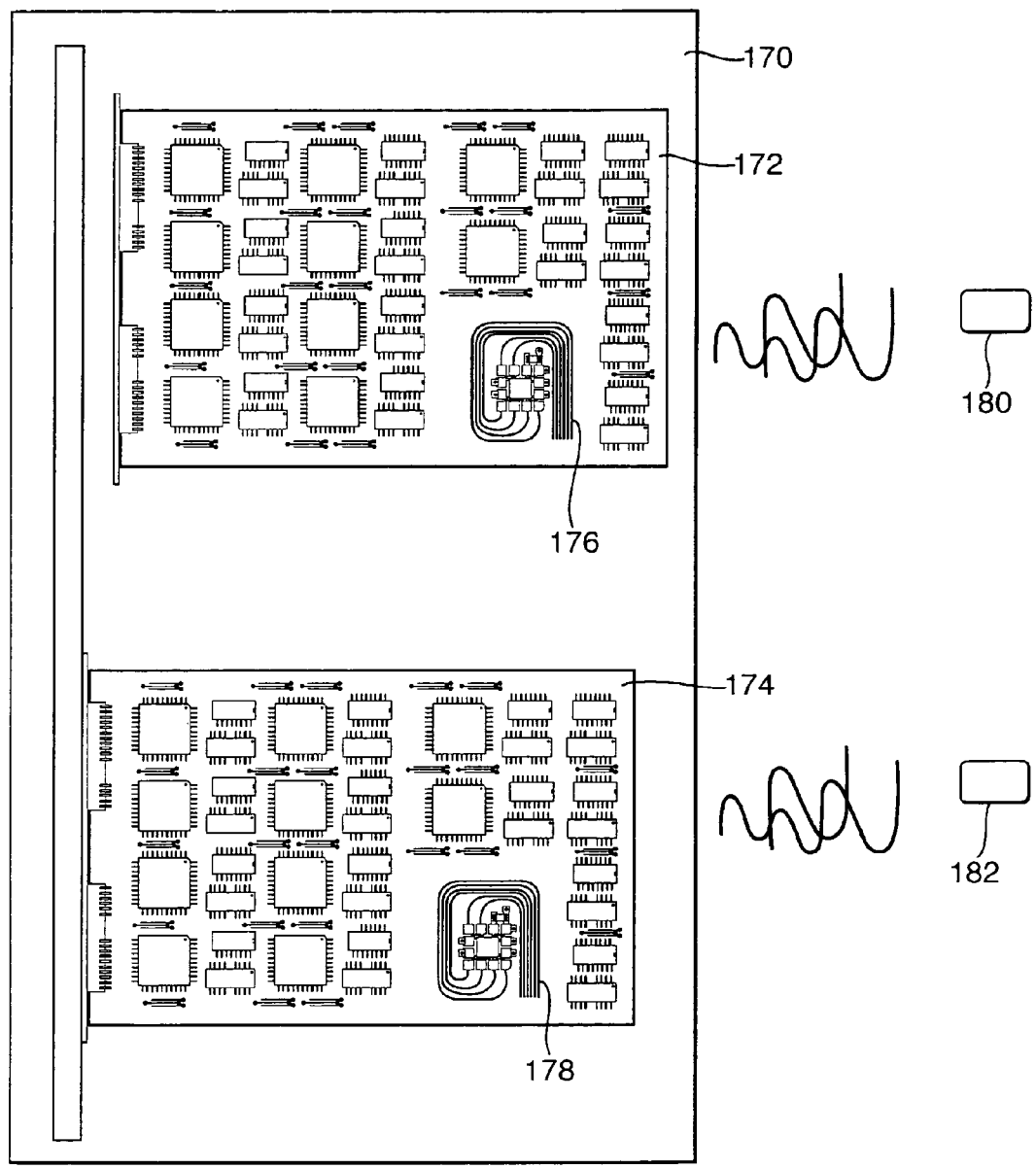
FIG. 18 is a schematic illustration of a data router containing PCB's provided with RFIB devices.

FIG. 18 shows a telephone data router 170 containing a PCB 172 having an integrated RFID device 176 attached. In other embodiments, a non-integrated attached RFID device could be used. This technology is also applicable to other systems and apparatus. The router 170 also contains a PCB 174 having an RFID device 178 attached. The PCB 174 is electronically connected to the router 170 and is operating. The PCB 172 is not yet electronically connected to the router 170. A seeker device 180 associated with the router 170 can interrogate the PCB's 172 and 174. The PCB 172 can respond via RFID device 176 in a passive mode. In other words, although the PCB 172 is not electronically connected to the router 170 and so is not powered, it can respond in a passive mode to the interrogation signal from the seeker 180. However, the PCB 174 is powered and connected to the router 170. The RFID device 178 can respond to the seeker 180 in an active mode and this has a much larger range. Seeker 182 is located further away from the apparatus 170 and the seeker 180. Instead of being associated with only one machine, the seeker 182 can interrogate the components of a large number of machines. In response, it can receive signals from RFID devices which are acting in an active mode on those machines. Both seekers 180 and 182 can be used to request and transfer a wide range of information. This includes simple identification information concerning the identity of the various components of the router 170 and other components in the vicinity. In addition, it can request and receive information concerning the status, ID, operational efficiency and other such information from the components. Also, it can be used to upload other information from the devices and download information such as software updates. For example, the RFID devices can be used to download and/or upload software to and from the seeker 180 and 182 for use by various components.

Figure 19:
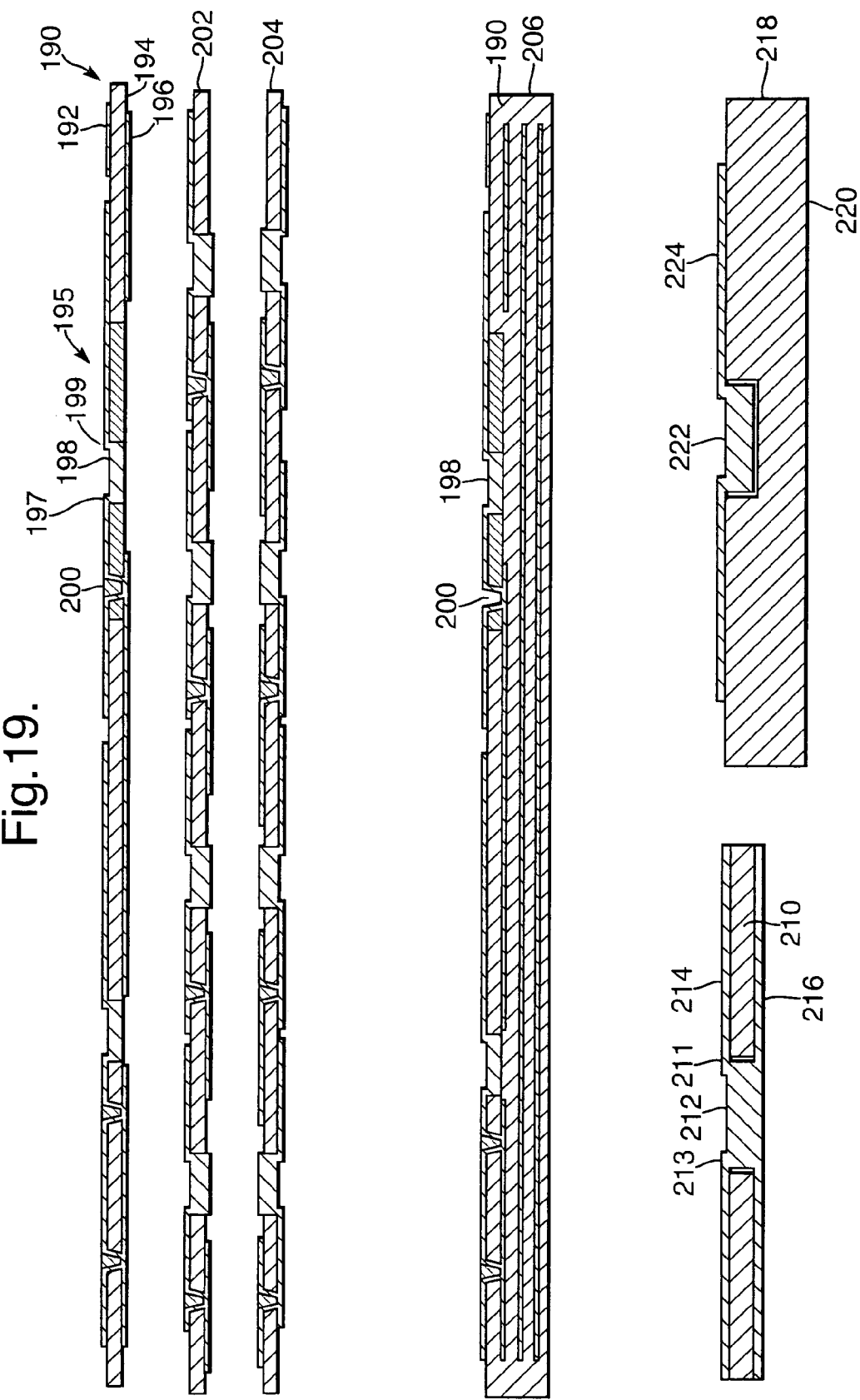
FIG. 19 is a schematic illustration of a masslam motion method of producing embedded active components.

Another application of the present invention is to mass lamination technology, other known as "mass-lam". Mass-lam technology involves the manufacture of multi-layer circuit boards in large scale batches, often customized for particular clients' needs. In particular, masslam technology allows the inclusion of varied or hidden components in the multi-layer structure. Often, mass-lam products have from four to six layers although much higher numbers of layers, such as 40, can be produced. They are often made in batches, from a few hundred up to many thousands of boards. The present invention allows masslam technology to produce multi-layer boards having buried RFID components which can operate in a passive and/or active mode. FIG. 19 shows this in more detail.

A single layer 190 is shown with a number of features. The layer 190 can be used to build up a mass-lam multi-layer board. It comprises a lower layer 196 of copper, an intermediate non-conducting layer 194 made of silicon and other components such as epoxy resin, and an upper layer of copper 192. The upper and lower layers 192 and 196 can be etched in normal ways to give conductive pathways. In the manufacturing process, part of the layer 194 has been etched away to form a microvia 200 which has been coated with copper. This allows an electronic connection between the upper layer 192 and the lower layer 196. Also, an aperture in layer 194 was major in the manufacturing process in which was placed a silicon chip 198, as will be described in more detail below. The layer 190 has a number of chips and layers. The chip 198 is connected to conducting fingers 197 and 199 of the upper conductive layer 192. This allows a chip to be connected to the layer 190 and allows for electronic connection. This process will be discussed in more detail below. Similarly, layers 202 and 204 can be produced having electronic functionality embedded therein. Layers such as 190 can be used to build-up a multi-layer board such as 206. As shown, the layer 190 forms the upper part of the board 206. As will be described below, this technology can also be used to bury or embed active components within the multi-layer part of another layer as shown generally at 208. Again it comprises an upper conductive layer 214 and intermediate non-conducting layer 210 and a lower conducting layer 216. In an aperture in the intermediate 210 is placed a silicon chip 212. As similarly to chip 198, the chip 212 is attached to conductive fingers 211 and 213 of the upper conductive layer 214 which extend partially over the aperture in the intermediate non-conducting layer 210. In this case the upper and lower conductive layers are made from different materials. During manufacture, the chip 212 is connected to an etched sheet of copper 216 so that it is attached to preformed connectors or fingers. The copper sheet 216 is attached to the non-conductive layer 210, with apertures or recesses formed by machining or laser ablation for receiving components such as the chip 212. Tracks of conductive polymer are then laid on top of the chip 212 and non-conductive layer 210 so give a completed layer grouping. Other materials, such as conductive inks, could be used.

Another embodiment of a layer is shown generally at 218. It comprises a relatively thick intermediate layer 220 with an upper conductive layer 224. A chip 222 is located within a recess in the upper surface of the layer 220. The chip 222 is connected to the upper conductive layer 224. In this embodiment, the chip 222 is located within an aperture within the upper surface of the intermediate layer 220, rather than in an aperture extending through the layer 220.

Figure 20:
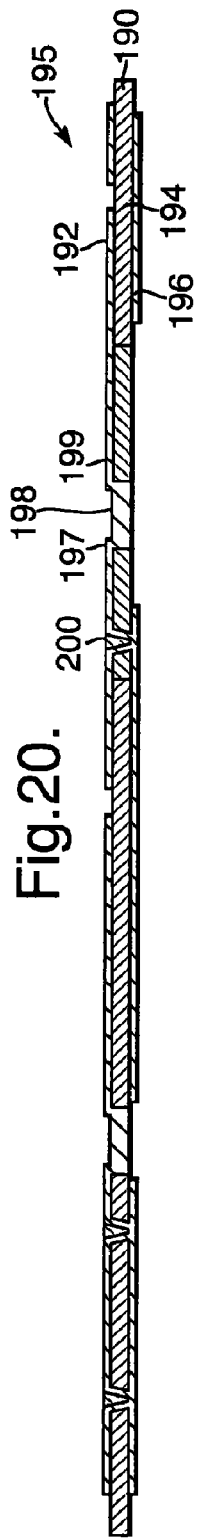
FIG. 20 is a cross-sectional view of a layer grouping containing an embedded RFID device.

FIG. 20 shows the layer 190 before incorporation into a final multi-layer board.

Figure 21:
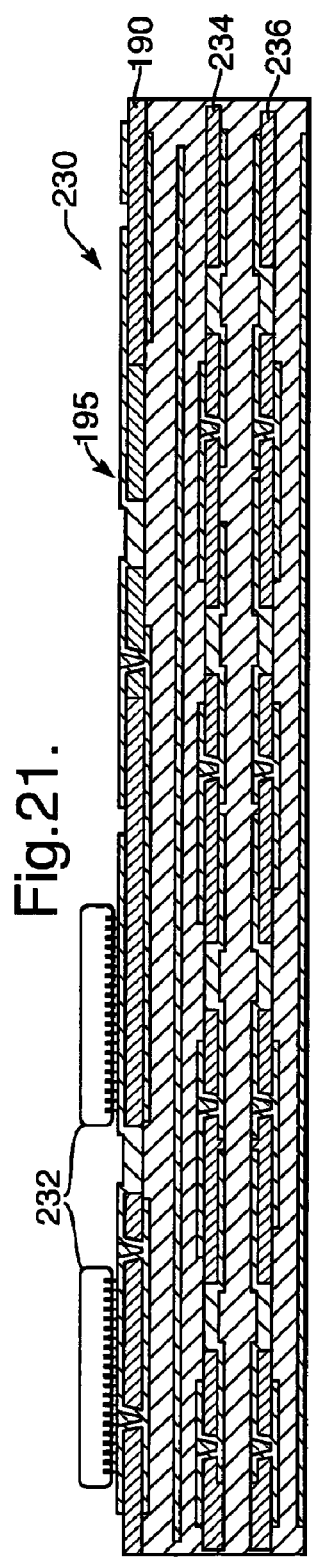
FIG. 21 is a cross-sectional view of a PCB containing an integrated RFID device.

FIG. 21 shows such a multi-layer board 230, comprising seven layers. This technology is applicable to other laminate structures, such as boards with less or more than 7 layers. The above mentioned layer 190 is incorporated into the multi-layer board 230 as its upper layer. It has a number of components, such as microprocessors 232 attached to its upper surface. There are two other similar layers 234 and 236 incorporated into the multi-layer board 230. The RFID device 195 can act in a passive or an active mode. The layers 234 and 236 have a number of embedded components and connections between layers such as copper coated microvias. This gives the board 230 embedded active functionality. In addition, this technique allows the embedding of RFID devices which can act in a passive and/or active mode. There are numerous advantages and applications arising from the embedding of such devices.

The burying of an RFID device within a mass-lam board allows for high security tracking of components. As mentioned above, this can allow the tracking of individual layers or the final board during several stages of manufacture. The integration of the RFID device with the board itself allows for the transfer of information to and from the RFID device and the other components on the board. This allows not only simple identification information to be passed, but also allows testing, status and history information to be exchanged. It also allows a tamper-proof way of identifying components and boards. As the RFID device is integrated within the board during manufacture, it gives a cost-efficient method of uniquely labelling components. It also allows such components to talk to other components and for the exchange and arrange of information.

Figure 22:
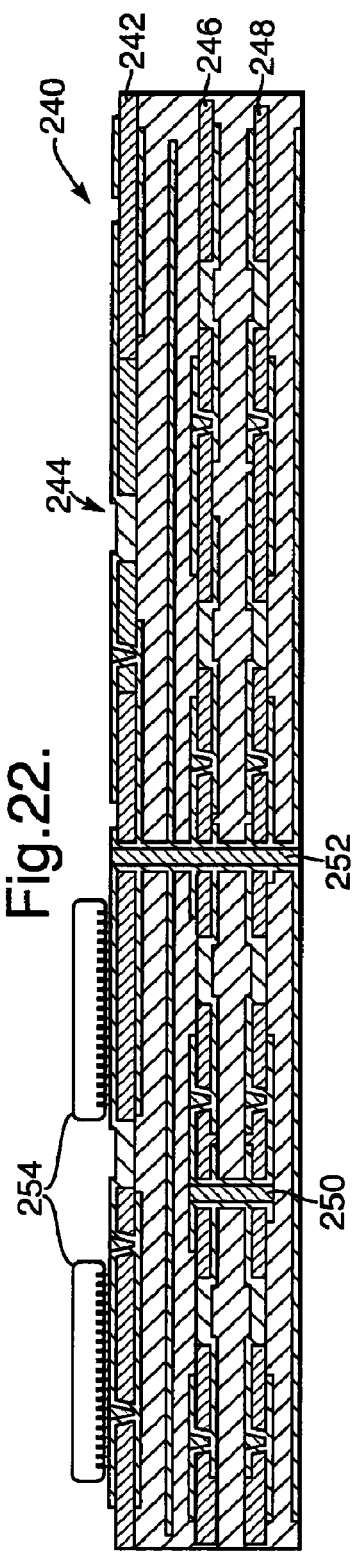
FIG. 22 is a cross-sectional view of another PCB containing an integrated RFID device.

FIG. 22 shows a completed multi-layer board 240. It has seven layers, the uppermost layer 242 containing an integrated RFID device 244. Again, this technology is also applicable to boards with more or less than 7 layers. There are also two other layers embedded passive and/or active components, 246 and 248. A copper coated via 250 connects the layers 246 and 248. A plated through-hole (PTH) traverses the seven layers of the board 240 connecting some of the layers together. Some of the layers have clearances around the PTH to avoid a connection.

Figure 23:
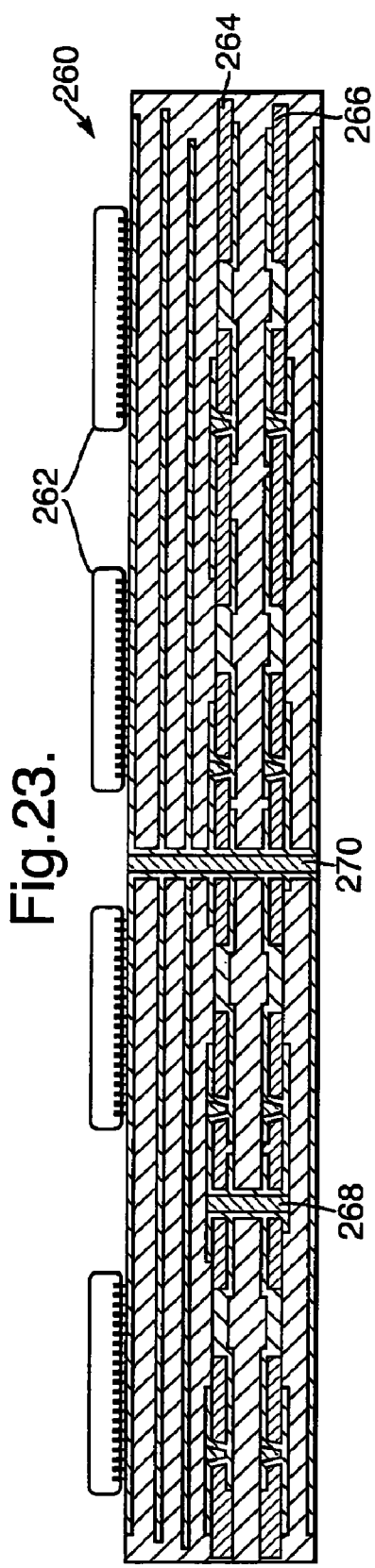
FIG. 23 is a cross-sectional view of another PCB containing buried active components.

FIG. 23 shows a further mass-lam multi-layer board 260. This is similar to the board 240 shown in FIG. 22 except that it does not have a component-containing upper layer. It does have components 262 connected to its upper surface. It also has embedded layers 264 and 266 which have a number of active and/or passive components and connections. A coated layer 268 connects the layers 264 and 266 whilst a PTH traverses the board 260, allowing connection between all layers.

Figure 24:
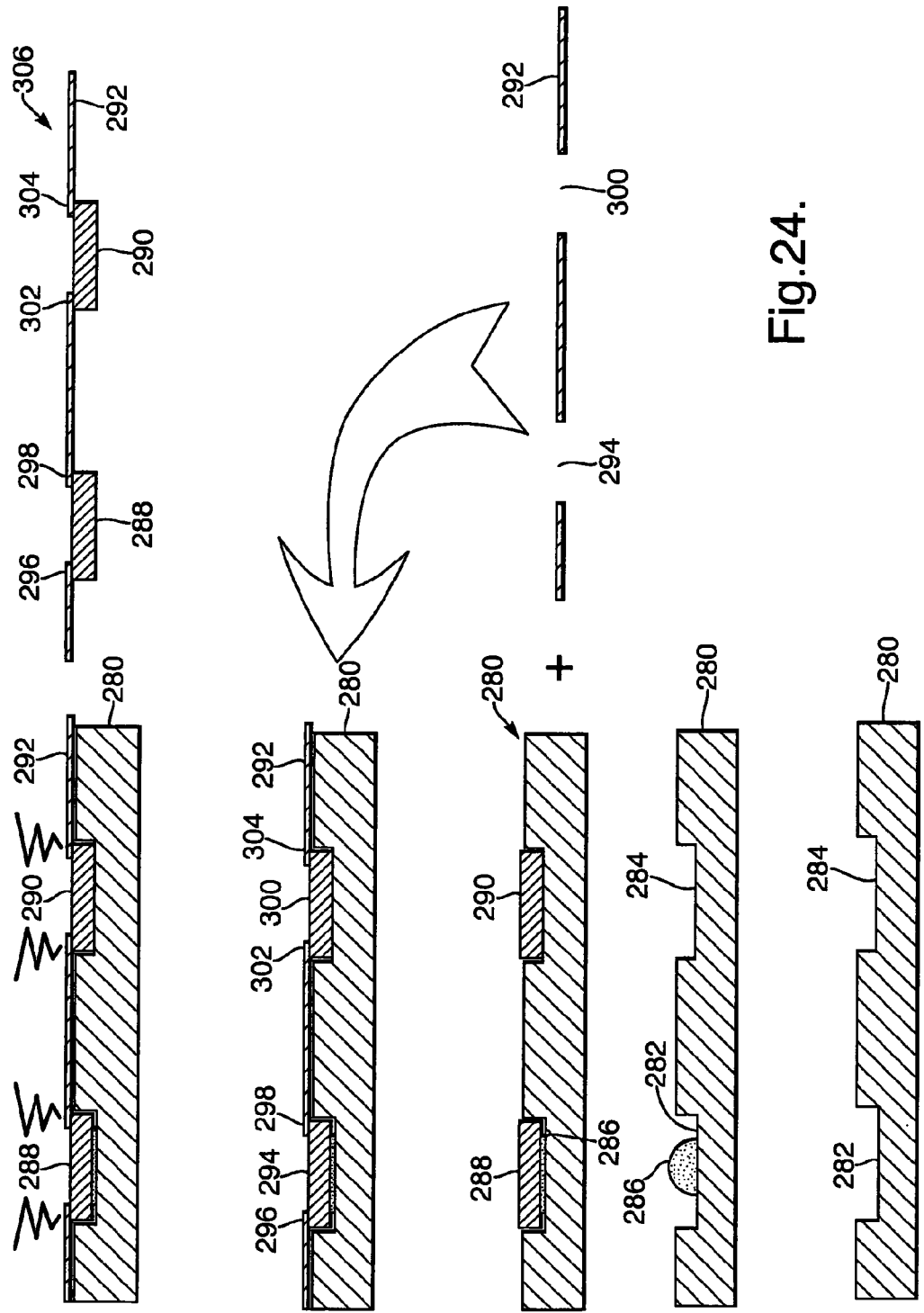
FIG. 24 is a schematic illustration of a method of attaching components to a conductive layer.

FIG. 24 shows one method for the construction of layers containing components considerable for use in mass-lamination. The correct alignment and registration of components with electrical connections and mechanical supports is very important. One method to achieve accurate connections between components is shown in FIG. 24. FIG. 24 shows the use of an assembly aid 280 to position silicon components with a conductive layer. The assembly aid 280 comprises a block of material containing a number of apertures to temporarily hold components therein. The assembly aid 280 may be made using stereolithography techniques or photo-definable, or laser-definable polymers similar to solder resist films or liquids. The assembly aid 280 comprises two rectangular recesses 282 and 284 on its upper surface. These can be used to temporarily hold components either with or without the aid of an adhesive. A small drop of adhesive 286 may be placed in aperture 282. Although the term adhesive is used, this is really used to indicate the fact that a component is held in some way by the adhesive in the recess 282. It does not need to be a traditional adhesive but may simply be a drop of liquid which acts to retain the component by surface tension etc. The word 'adhesive' is used to indicate any material which acts to hold the component in place, not necessarily indicating that such material is an adhesive per se. Other techniques such as electrostatic attraction may be used. A component 288 may then be placed into the aperture 282 by conventional techniques. Alternatively, component 290 may be placed into recess 284 without the use of an adhesive. Once the components 288 and 290 are held in recesses 282 and 284 respectively, a conductive layer 290 may be placed on top of the component. The conductive layer 292 comprises a sheet of copper which has been etched to provide a network of conductive pathways and connections. In particular, there are apertures 294 and 300. The sheet 292 is carefully aligned on top of the assembly 280 so that the aperture 294 is located above the aperture 282 of the assembly 280. Similarly, the aperture 300 of the conductive layer 292 is aligned with the aperture 284 of the assembly aid 280. As shown, the apertures 294 and 300 are slightly smaller than the apertures 280 and 284 respectively in order to provide electrical contacts or fingers 296 and 298, 302 and 304 which extend over a part of the components 288 and 290 respectively. These allow mechanical and electrical connection between the conductive pathway 292 and the components 288 and 290. As shown, sonic welding may be used to connect the components 288 and 290 to the layer 292. Other techniques may be used. After connection, the assembly aid 280 may be removed leaving the conductive layer 292 with components 288 and 290 attached thereto. Because such a structure may be mechanically weak, it is advantageous to provide a backing to the completed structure in order to provide mechanical stability. This may use techniques which are used and compatible in traditional PCB manufacturing processes. For example, an epoxy resin layer may be used to totally encapsulate or to provide a layer on one of the sides of the completed structure 292. Any such layering or encapsulation may be permanent or temporary. In other words, a mechanical strengthening layer may be attached to the layer 292 with components attached thereto for later removal after certain manufacturing steps.

Figure 25:
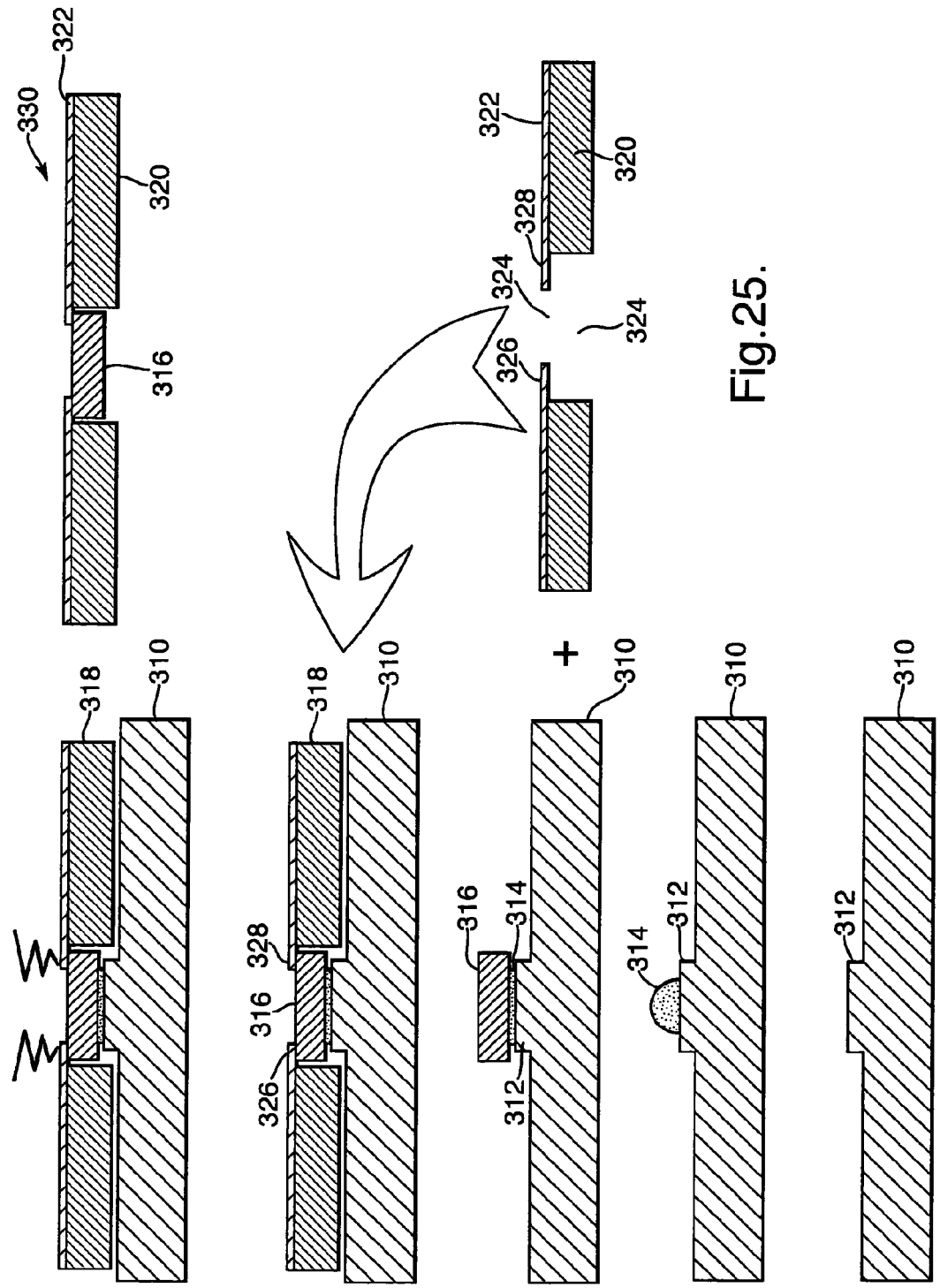
FIG. 25 is a schematic illustration of another method of attaching components to a conductive layer.

FIG. 25 shows an alternative method of connecting components to a conductive layer. An assembly aid 310 is provided which has a projection 312 on its upper surface. It is in contrast to the assembly aid 280 described above which has apertures 282 and 284 set into its upper layer. Again, a drop of adhesive 314 may be used to temporarily hold a component 316 on the assembly aid 310. In this embodiment, a backed conductive layer 318 is used. Backed conductive layer 318 comprises a thin sheet of conductive material 322 which has a number of conductive pathways formed thereon. It is provided with a mechanical strengthening layer 320 on its lower surface. The layer 320 comprises normal PCB material such as fibreglass-containing resin. The layer 320 has an aperture 324 located therethrough. A smaller aperture 324 is provided on the conductive layer 322 in legislation with the larger aperture 324. Projecting copper fingers 326 and 328 are provided at the upper end of the aperture 324. The projecting nature of the component 316 on the projection 314 allows the assembly aid 310 to be placed against the backed layer 318. The component 316 is then pushed up against the conductive terminals 326 and 328. Ultrasonic welding may then be used to attach the component 316 to the conducting layer 322. The assembly aid 310 may then be removed to give a backed layer 330 containing attached components. This layer may be used directly in further mass-lam manufacturing processes.

Figure 27:
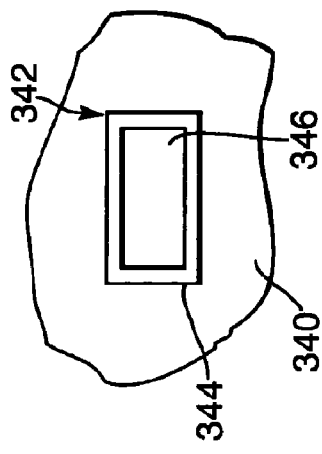
FIG. 27 is a plan view of an assembly aid.
Figure 26:
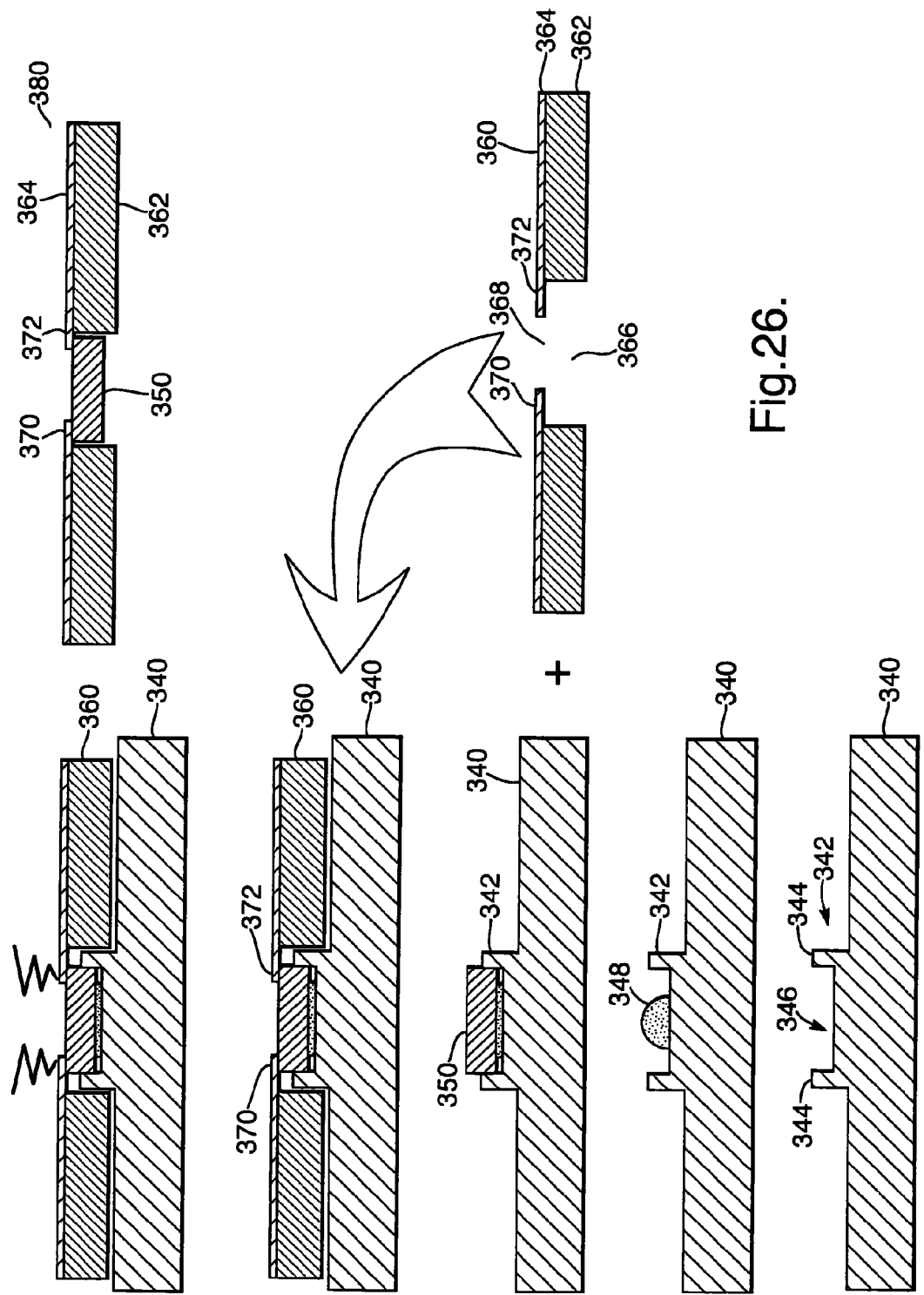
FIG. 26 is a schematic illustration of a further method of attaching components to a conductive layer.

FIGS. 26 and 27 show another embodiment of this technology. An assembly aid 340 is shown having a rectangular projection 342 on its upper surface. The projection 342 is of rectangular shape having a raised peripheral wall 344 surrounding a raised rectangular recess 346. A plan view of a portion of the assembly aid 340 shown in FIG. 27. Again, a component 350 is temporarily held by the assembly aid in the aperture 346 by an adhesive 348. A backed layer 360 is then introduced, comprising a layer of non-conductive material such as epoxy resin 362 with an upper conductive layer 364. Again, the non-conductive layer 362 is provided with an aperture 366. The upper conductive layer 364 has a number of extra conductive pathways and has an aperture 368 surrounded by fingers 370 and 372 which overhang the aperture 366. The component 350 may be located within the aperture 366 by cooperation and alignment of the annular walls 344 of the projection 342 into the aperture 366 in the backed layer 360. The raised nature of the projection 342 allows the component 350 to be accurately located against the fingers 370 and 372 of the backed layer 360. This is useful where the component 350 is on a much thinner cross-section than the layer 362. This may be useful where the silicon component is of a thin cross-section in order to improve operation and speed. This may be less than the standard depth of the layers used in mass-lam technology. However, the difference between the depths of the component 350 and the layer 362 can be accounted for by the use of a raised locating projection 342. Ultrasonic welding can then attach the component 350 to the terminals 370 and 372 to give a completed component containing layer 380. The space around the component 350 may be filled in with a suitable in-fill material, such as epoxy resin.

Figure 28:
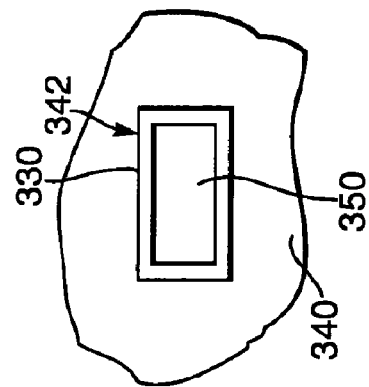
FIG. 28 is a plan view of the assembly aid containing FIG. 27 containing a component.

FIG. 28 shows a plan view of the component 350 located within the recess 346 of the projection 342 before being attached to the backed layer 360.

FIG. 29 shows alternative ways in which a component 350 can be held by an assembly aid. As shown above, the assembly aid could be a simple rectangular aperture 380 in which the component 350 sits in a close sliding fit. Alternative shaped recesses could be used to hold and align the components 350 ready for accurate insertion into a desired location. For example, the aperture 382 is of substantially rectangular shape with six rounded projections 384 which hold the component 350. Alternatively, recess 386 is of substantially rectangular shape with six pointed projections 388 holding the component 350. Aperture 390 is a further example and is of substantially rectangular shape with four rectangular projections 392 which hold the component 350 in place. A further possibility is exemplified by aperture 394 which is of arcuate shape. It has two lobes with a narrow waist in between. The shape of the recess 394 prevents the component 350 from twisting and thus holds it ready for accurate alignment and placing. Any shape which holds the component in place may be used.

As can be appreciated, the technology disclosed herein can be used in a vast number of applications and situations. FIG. 30 shows one possible application. A house 400 is provided with an RFID seeker or interrogation device 402. The owner of the house also has a car 404 having an electronic device 406 in which is embedded an RFID device. The seeker device 402 periodically interrogates the device 406 in the car 404 and receives a response signal. Thus, the seeker unit 402 is effectively checking that the car 404 is safely parked nearby. If the car 404 is stolen, the car 404 will be taken out of range of the seeker unit 402. When the seeker unit 402 then attempts to contact the device 406 in the car 404, it will not receive a signal in response. The seeker unit 402 will then attempt to contact the car 404 by emitting a more powerful interrogation signal. If the car has been taken away, the seeker unit 402 will be unable to receive a response. It will then take appropriate action. This action may include a visual and/or audible alarm, e-mails or text signals to the owner and other authorities and the creation of an entry in a log.

Because the RFID device is embedded within a PCB 406 which forms part of the car's essential circuitry, it cannot be turned off or removed without damaging the car's systems. Other possibilities include information exchange between the device 406 and the car 404 and a seeker unit 402 and a house 400. The car's status and servicing requirements may be transmitted in an active mode from the device 406 in the car 404 to the seeker 402. The seeker unit 402 may be networked or be connected to a local computer in order to act on the information received. It may be that the car manufacturer may wish to upgrade the software on its cars and may do so by downloading the necessary information from the seeker unit 402 to the device 406. Alternatively, the engine of the car 404 may run according to different modes, for example in a sports mode or a more efficient lean-burn mode by information downloaded by an RFID device in the PCB 406.

FIG. 31 shows an alternative arrangement in which a house 410 contains an RFID containing PCB device 412. A car 414 is provided with a seeker unit 416. In this case, the seeker unit 416 may transmit its ID to the device 412 in the house 410. The RFID device on the PCB 412 again may periodically request a response from the seeker unit 416 in the car 414 to show that the car 414 is safely parked within range. This is similar to the situation set out above. In addition, seeker unit 416 may act to collect information on other articles contained in the car 414 and to make sure that they are taken within range. For example, the owner of the car 414 may have a lap-top computer in the car 414. Thus, seeker unit 416 will periodically check to see if there are any devices within the car 414. The lap-top, containing an embedded RFID device within its circuitry, will respond accordingly. The owner may wish to register the lap-top with the seeker 416. Thus, the owner may safely leave the lap-top computer within the car 414, with a seeker unit 416 checking to see that the lap-top computer is within range. Again, if the seeker unit 416 detects the removal of a registered product such as a lap-top computer, it may take appropriate action including alerting the owner to the disappearance. Both of these systems shown in FIGS. 30 and 31 may be used to help service the cars 404 and 414. An authorised garage may remotely request information concerning the car, its identity, its history and its components via the device 406 with a seeker 416.

Figure 32:
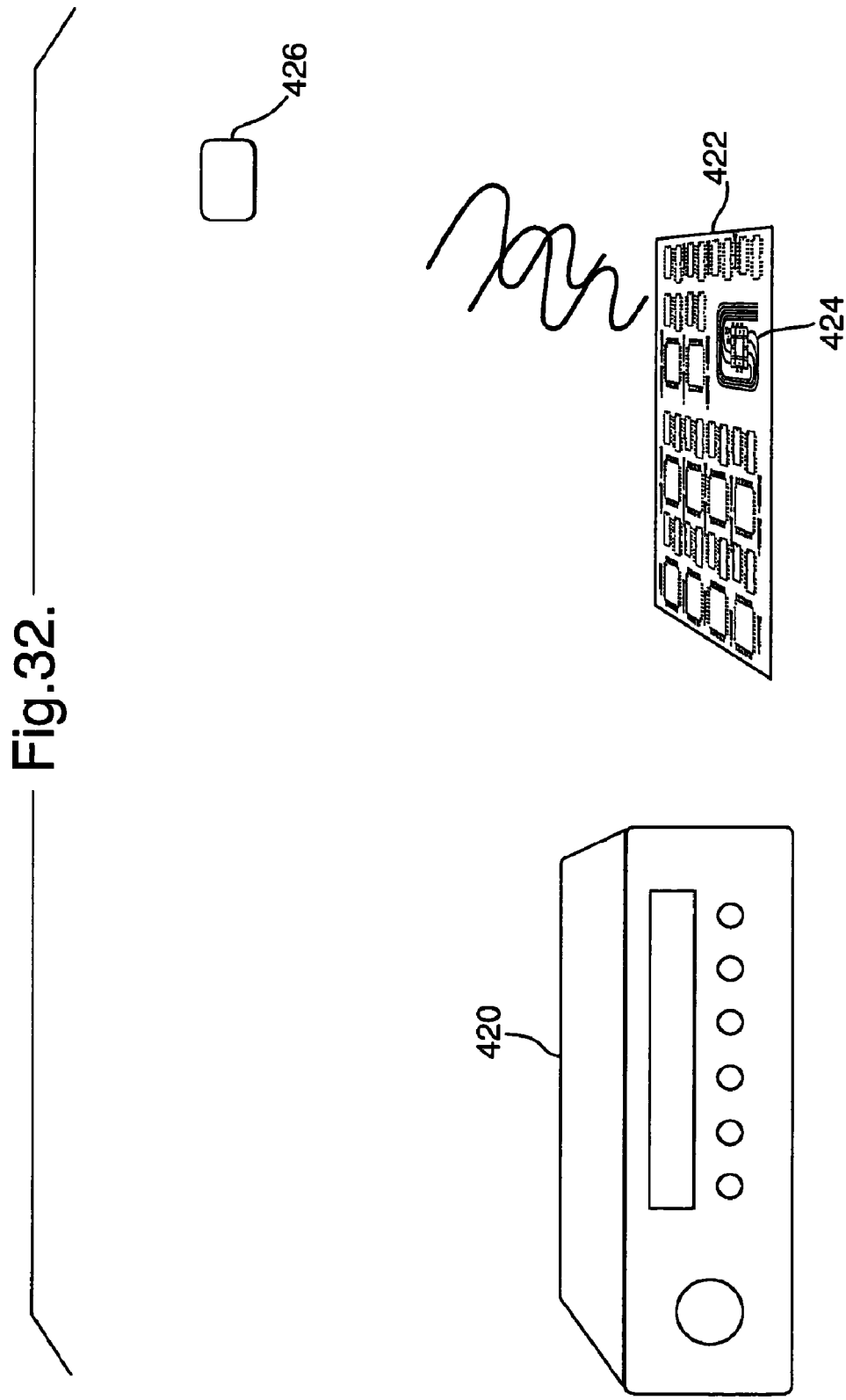
FIG. 32 is a schematic illustration of a further application of an RFID containing electronic device.

FIG. 32 shows another application of this technology. In this case an electronic device, in this case a DVD player 420 contains a PCB 422 having an embedded RFID component 424. The house in which the DVD player 420 is located is provided with a seeker unit 426. In addition to applications such as detecting the presence of a car as described above, the seeker unit 426 may be used to maintain an inventory of devices and machines within the house. In addition to merely checking the identity and location of such devices, the seeker unit 426 may be used as a wireless link to upload and download information from various devices within the house.

The invention claimed is:

1. A substantially flat and rigid multilayer printed circuit board (PCB) having a tamper-proof RFID component, comprising:
   a radio frequency identification device (RFID) component comprising an electronic core and an antenna;
   wherein at least the electronic core of the RFID component is integrated into the multilayer PCB to render the electronic core tamper proof.

2. The multilayer PCB of claim 1, wherein both the electronic core and the antenna are integrated into the at least one layer of the multilayer PCB.

3. The multilayer PCB of claim 1, wherein:
   the RFID component is operable to act in an active mode when powered by electrical energy supplied through the multilayer PCB; and
   the RFID component is further operable to act in a passive mode when not powered by electrical energy supplied through the multilayer PCB.

4. The multilayer PCB of claim 1, wherein the RFID component is electronically connected to said at least one a layer of the multilayer PCB.

5. The multilayer PCB of claim 4, wherein:
   the RFID component comprises an antenna;
   the RFID component is operable to act in an active mode when powered by electrical energy supplied through the multilayer PCB; and
   the RFID component is further operable to act in a passive mode when not powered by electrical energy supplied through the multilayer PCB.

6. The multilayer PCB of claim 4, wherein the antenna comprises metal.

7. The multilayer PCB of claim 4, wherein the antenna comprises copper, platinum, silver, gold, tin or aluminum.

8. The multilayer PCB of claim 4, wherein the antenna comprises conductive polymer, conductive ink and/or conductive plastics.

9. The multilayer PCB of claim 1, wherein the RFID component is operable to transmit and receive information.

10. A method of making a multilayer PCB, comprising the steps of:
providing a radio frequency identification device (RFID) component comprising an electronic core and an antenna positioned on a substantially flat and rigid multilayer PCB; and
integrating at least the electronic core of the RFID component into at least one layer of the multilayer PCB to render the electronic core tamper proof.

11. The method of claim 10, further comprising the steps of:
configuring the RFID component to be operable to act in an active mode when powered by electrical energy supplied through the multilayer PCB; and
further configuring the RFID component to be operable to act in a passive mode when not powered by electrical energy supplied through the multilayer PCB.

* * * * *